United States Patent [19]
Rice

[11] Patent Number: 5,347,387
[45] Date of Patent: Sep. 13, 1994

[54] SELF-ALIGNING OPTICAL TRANSCEIVER

[76] Inventor: Robert C. Rice, 3724 Amsterdam Ter., Burtonsville, Md. 20866-1927

[21] Appl. No.: 856,995

[22] Filed: Mar. 24, 1992

[51] Int. Cl.$^5$ ............................................. H04B 10/00
[52] U.S. Cl. .................................... 359/152; 359/159;
250/203.2; 356/5; 318/640
[58] Field of Search ................ 359/143, 144, 152–153,
359/159, 169–170; 250/203.2; 356/5, 152;
318/640

[56] References Cited

U.S. PATENT DOCUMENTS

| | | | |
|---|---|---|---|
| 4,484,565 | 11/1984 | Mori | 250/203.2 |
| 4,867,560 | 9/1989 | Kunitsugu | 359/159 |
| 4,888,816 | 12/1989 | Sica, Jr. | 359/152 |
| 5,060,304 | 10/1991 | Solinsky | 359/152 |

FOREIGN PATENT DOCUMENTS 8300382  2/1983  PCT Int'l Appl. .............. 250/203.2

Primary Examiner—Richard E. Chilcot, Jr.
Assistant Examiner—Kinfe-Michael Negash
Attorney, Agent, or Firm—ChenPatents

[57] ABSTRACT

A compact self-aligning transceiver for high bandwidth cooperative duplex communications, laser image projections or surveillance applications comprises a base mounted hermetic transparent sphere encapsulating a system of two or more pancake motors, two of which are being nested and orthogonal to each other to suspend and rotate a system of optical components centrally located within said motors for receiving and selectively transmitting radiation beams.

26 Claims, 12 Drawing Sheets

SELF-ALIGNING OPTICAL TRANSCEIVER

BACKGROUND OF THE INVENTION

1. Field of Invention:

This invention relates to a compact, self-aligning optical transceiver, and more specifically to a transceiver with optical components suspended in a frictionless manner either electromagnetically or pneumatically and protected from a wide range of relative carrier movement and acceleration.

2. Discussion of Prior Art:

Prevalent data transmission or communication links use radio and microwave transmission. There is a need for a new device to alleviate the problems of congestion, intermittent interference and possible interception and of shared radio and microwave frequency bands. Optical data links using line-of-sight transmission have been suggested. Following are patents and literature references illustrating devices using lasers for communication.

U.S. Pat. No. 4,867,560 relates to a satellite communication system having a dual-beam optical alignment system for automatic adjustment of the axes of beams of different wave lengths into a predetermined optical axis.

U.S. Pat. No. 4,933,928 shows an optical communications terminal apparatus for sending and receiving transmissions to and from a plurality of remote stations by a plurality of independent terminals using a multiplexer. All of the transmitted and received modulated beams have different wavelengths; they are separated by wavelength and directed to their correct destinations.

U.S. Pat. No. 4,882,772 relates to communications signal transmission systems particularly to electro-optical light beam television, telephone and digital data transmission systems specifically for urban installations to replace cables, and needs manual alignment with the aid of a telescopic sight. The system also includes a heat sink for dissipating heat from a laser generator.

Published references include "Shipboard Electro-Optical System Integration," by Robert J. Giannaris, et al,. pp 120 -125, SPIE Vol. 103, Systems Integration & Optical Design II (1977); and "Pointing, Acquisition and Tracking for Intersatellite Optical Data Links," by W. Auer, pp. 131 -136, Proc. ESA Workshop on Space Laser Applications and Technology, Les Diablerets, March 1984. Both these references disclose apparatus having pointing, acquisition and tracking capabilities and use a laser.

None of the above references relate to a system for suspending components of an optical transceiver in a frictionless manner by means of electromagnetic motors. This is achieved in the present invention by two thin profile orthogonally nested electromagnetic motors, herein referred to as pancake motors. Alternatively the motors may have pneumatically assisted suspension. When activated, the motors will work in concert with each other and with controlling logic to suspend the transceiver's optical components and enable accurate pointing of its transmission beam.

The preferred embodiment of the transceiver of this invention, hereafter referred to as the "transceiver", is described in detail in following sections of the drawing. Refer to FIG. 2 for an overall illustration of the transceiver. The transceiver has been designed to accomodate a wide variety of applications with little or no variation of components as described for the following intended applications.

The transceiver provides a universal mounting system which adds a third motor axis to the two pancake motor axes supporting the optical platform so as to enable alignment of the beam in any direction relative to the carrier mounting. This full surround movement will facilitate mobile mountings and applications requiring a panoramic alignment capability.

Applications can be classified as either independent or dependent mode. When operating in independent mode, a transceiver is not dependent upon receiving a beam emitted from one or more cooperating devices thus forming a cross-link.

Independent Mode Applications

Many applications will require independent or mostly independent mode operation such as the following two examples. Independent mode operation is facilitated by the design of the pancake motors of the transceiver which will enable control logic to precisely encode the displacement of the optical platform relative to the carrier and also to provide the logic with acceleration information from the suspended components enabling it to calculate the position and velocity of the platform and thus aim the beam independent of carrier movement.

Laser projector

With the addition of a motor to translate the position of the light source relative to the other optics, a transceiver would be capable of rapidly displacing the transmitted beam over a small area so as to be able to draw characters or other graphics on a diffuse reflecting object. The pancake motors would provide the slower pointing required to displace the beam over a very wide area. The transceiver may therefore be ideally suited for use as a projector for a panoramic or dome screen.

The receive capability of the transceiver would allow for accurate synchronization and alignment of the beam with fixed registration points, such as could be created with light emitting diodes, or with other transceivers to draw multiple icons or colors. Since transceivers can emit light polarized in either of two planes, a pair of transceivers could project a three dimensional image to viewers wearing polarizing filter lenses.

Three dimensional imaging

When combined with a distance measuring function, a transceiver would enable controlling logic to construct a three dimensional image of the transceiver's surroundings by sensing reflected light.

Dependent Mode Applications

Many applications for the apparatus will depend upon the cooperation of one or more other devices to form a cross-link and convey information. For these applications, the transceiver will operate in an independent mode until a signal is detected and then will align with and track the received beam. Some potential applications of this type are the following:

Computer and peripheral interfaces

Although diffuse infrared and radio have been suggested for providing data links for portable low speed computer peripherals, no convenient portability solution currently exists for computers and peripherals with high speed interfaces. In many installations it would be highly desirable to be able to move computers and peripherals without moving cables or requiring a system shutdown. Another problem that could be solved by dependent mode optical transceivers is the distance limitation characteristic of most high speed links.

Digital Networking

Transceivers are intended to be used in network applications and may be capable of directly interconnecting with each other or with other devices to form an optical network node. In order to support high bandwidth switching capability, non-blocking adaptive routing network logic may be developed for the transceivers. Since the configuration of the optical network physical links may be changed merely by realigning the transceivers, heuristic algorithms may seek the optimal interconnection of transceivers to obtain maximum throughput of the network. A transceiver may receive instructions from network processes to interrupt a link and scan in a particular direction. It is anticipated that the network logic may be able to expand sufficiently to support relaying between a very large number of transceivers.

An important characteristic of a transceiver network is that the overall performance of the network will increase as more transceivers cooperate and adapt to each other and the network. This will be due to increased processing, memory and total link bandwidth, shorter average distance of the links, and greater redundancy for network paths. Thus, by increasing the number of transceivers available to the network, virtually any desired reliability and throughput characteristics may be obtained. This behavior is contrary to that of broadcast mode radio links which degrade in performance as more transceivers are added to the network due to busier frequencies and increased probably of collision from random transmissions.

Based upon experience from tracking links, network logic may learn the limits of a transceiver's carrier environment so as to be able to provide advance warning of an impending loss of a link to a network process.

Transportation

The transceiver is especially designed for mobile applications, and particularly for carrier mountings which may be subject to a wide range of movement and vibration. Shock absorption is accomplished by a combination of components including a flexible mounting stem and the suspension provided by the pancake motors.

Aviation

The aviation industry has an imminent need for higher bandwidth analog and digital communication links between aircraft and ground networks in order to support myriad services envisaged for crew, passenger and navigational systems, many of which deal directly with flight safety. In this age of rapid technological advancement, passengers of commercial airliners remain relatively isolated from ground communication systems. There are currently few data communications services available for passengers even though a rapidly increasing percentage of travelers are equipped with lap top computers. Although passenger telephone service is available, the service has a limited number of channels and is insecure.

Pilots of light aircraft have also expressed a need for better communications capabilities in order to avail themselves of services that are presently available only to commercial airline pilots such as pre-departure clearance and meteorological information. The optical cross-link solution offers great potential for providing a very affordable communications service to general aviation.

The optical transceivers would be installed on the aircraft as non-hazardous devices. They could be easily retrofit to many operational commercial aircraft by replacing a portion of the fiberglass nose and tail cones with a polycarbonate window and affixing the transceivers in the unpressurized areas of the front firewall in the periphery of the weather radar antenna and in the rear of the otherwise empty tail cones. They could be easily retrofit to most light aircraft by allowing the transceivers to protrude from the airframe while supported by the stem. At least three transceivers would be desirable for useful coverage about the aircraft.

Possible aviation uses would include the following:
  On aircraft, ground vehicles, terminal buildings, control and approach towers and to relieve radio frequency congestion in terminal areas.
  On aircraft for air to air communication, collision avoidance, reduced separation and more economical flight path routings based upon wind information.
  On aircraft for non-critical air to ground communications.

In the thin atmosphere at cruising altitude, 15,000–50,000 feet, it may be possible for optical links to reliably span great distances. Transceivers equipped with a precision distance measuring function could provide both the accurate relative position measurement and high communication bandwidth required for synchronizing air-to-air maneuvers such as formation flying and refueling and rescue operations.

For example, aircraft could be equipped with a lightweight cable near the tail and an engagement device near the nose, perhaps mounted to the front landing gear. The cable could be deployed with a small parachute, to enable engagement by another aircraft. The leading aircraft could provide thrust for the trailing aircraft, or the trailing aircraft could provide substitute rudder or elevator control for a disabled leading aircraft by pulling the cable at an angle to the fuselage. This application would require the data communications and directional characteristics that the optical transceivers would provide.

For long range air/ground communications, optical cross-links may be subject to atmospheric interference. An aircraft passing through dense fog or other precipitation could lose some or all of its optical links. Although not having the same reliability as the radio links, the optical links could serve to augment the radio data links under more favorable conditions. Since the response time of the network would be very fast, an avionics device could first attempt message delivery through the optical network and if a delivery confirmation is not quickly received, then the device would revert to delivery through a radio link.

Marine

The spherical shape of the transceiver shell is ideal for withstanding high pressure underwater. Due to the monochromatic nature of the laser light source, the transmitted beam would have minimal dispersion when passing through water. The self-aligning capability of the transceiver would adapt to the changes in refractive index at an air/water surface.

There are few transmission windows in the electromagnetic spectrum for underwater communications. Generally, useful wireless communications can occur only using very low frequencies or visible blue. Transceivers equipped with a blue or green laser source may provide short range mobile underwater communication links. Properly spaced networked transceivers may span longer distances and thus provide an alternative to cable for some underwater applications.

Since water would form a concave lens about an underwater transceiver's shell, the transceiver would require an object mirror with a slightly different shape to compensate for the aberration. Possible marine applications would include the following:

Port or marina area to relieve radio frequency congestion.

Aircraft to shipboard communications not requiring manual alignment of the transceivers.

Shipboard or aircraft to underwater communications.

Ground Vehicles

On ground vehicles, transceivers could be used with image recognition logic for collision alert and guidance. In dependent mode, the transceivers could link with other networked transceivers both mobile and fixed for chaining of vehicles, collision avoidance, automated ground traffic control, telephone and data link services.

Space

The aviation industry is not alone with the need for higher bandwidth, more secure digital communications links between ground systems and lofty mobile systems. NASA has similar problems in achieving high bandwidth communication in free space. Possible space applications would include the following:

Communications between remote locations of space stations to reduce cabling requirements.

Communications between astronauts and spacecraft. A transceiver with an angled stem would operate so as to avoid the shadow created by a relatively small host system.

Communications between space stations, satellites and spacecraft.

Space communications between ground computers and satellites or space stations. NASA is currently using microwave rather than optical for ground to satellite communications due to susceptibility to atmospheric interference. However, a network of optical cross-links between private, commercial and military aircraft may eventually achive excess bandwidth potential and allow aircraft at altitude to serve as a platform for relaying data to and from space.

Entertainment Industry

The transceiver is designed to have characteristics well suited for entertainment and other industry applications including low cost and the convenience of self-alignment. In an auditorium, dance hall or production studio there is typically a line-of-sight path available between equipment requiring interconnection. Transceivers for this environment would typically have a long support stem to elevate the optical components well above the audience. Hand held transceivers would typically house the base motor and cooling unit in a larger control box.

Fiber optic cables have not worked well for portable sound and video applications due to their low tolerance to tension and bending. An optical cross-link could replace several long and heavy interconnecting cables in addition to a multitude of electrical connectors and thus reduce the setup time and eliminate one of the most troublesome parts of the job. Possible applications would include the following:

Interconnecting microphones, mixer boards and amplifiers. Sound crews generally prefer to have the mixer panel in the back of the auditorium with the amplifiers and microphones on-stage. The mixer panel is a multichannel signal processor which does not necessarily have a high power requirement.

For large productions, a sound crew may mix up to 40 audio channels into up to 8 amplifier channels. This may require up to three heavy 1" diameter cables often referred to as "snakes". An optical link could easily multiplex this many channels (48 channels * 45,000 samples/second/channel * 8 bits/sample=17.2 megabits/second).

The transceiver may serve as a laser microphone with no additional components. Sound pressure waves striking the polycarbonate shell would be detectable by the active suspension of the outer motor and could be digitally output via the laser beam.

Television production studios for wireless camera video/sync signal connectivity in order to not constrain the movement of cameramen. An optical cross-link could easily carry several video channels.

Theater lighting control. In very large productions, up to 40 channels may be required for lighting control. Often, the lighting control cables are difficult and unsightly to route.

Cable service and telephone companies for bridging short range gaps in which routing cable would be difficult, expensive or unsightly. Currently microwave relay is the preferred solution to this problem, however, the availability of an inexpensive optical transceiver may provide an alternative.

Remote Control and Robotics

The versatility of the transceiver may have special appeal for robotics applications. A single transceiver may be able to provide a robot with an imaging device to sense its surroundings, an output display device for drawing characters on a diffuse reflecting surface such as a wall and a communications device for remote programming through another transceiver. The transceiver is also expected to find application for hand held or stationary remote control of mobile models, particularly for large groups where radio frequencies are limited.

With this wide range of applications in mind, the transceiver was designed to meet the following objectives:

1 Safe operation under all conditions. Since some hazard of intra-beam viewing exists if a portion of the beam is deflected, a high power transceiver may require logic to compare signal attenuation with that anticipated for the range and atmospheric conditions.

2 Maximum antenna (object mirror) diameter for a spherical mounting space. Assuming that other optical components can accurately maintain focus, the object mirror diameter will determine both the distance that the radiation will remain collimated and the efficiency of the energy collection. FIG. 8 best illustrates the area of the object mirror in relation to the size of the spherical shell.

3. Suitability for a wide range of sizes. The photoresist motor fabrication will allow for a miniaturized transceiver to be made smaller than 1 inch in diameter. However, a large transceiver will not only have a longer range potential but will have more PCB area for a switching logic and memory.
4. Minimum suspended weight to reduce the power requirement and increase the versatility of the transceiver.
5. Low cost. The transceiver is designed to be fabricated with a minimum number of components using state-of-the-art manufacturing techniques so as to be mass producible at a very low cost and for reliability, ease of assembly and repeatability of construction.
6. Maximum isolation of optical components from carrier shock and vibration.
7. Operation independent from carrier movement and acceleration.
8. No requirement for radial alignment of the carrier mounting with that of a dependent transceiver.
9. Minimum stray electromagnetic radiation. Transceiver motor phase windings form complete loops to cancel currents in connecting cables.
10. To provide for a precision distance measuring function. The very short optical wavelengths present the potential for an extremely accurate distance measuring function. A network of transceivers could triangulate to determine positions very accurately.
11. Easy installation. Transceivers with multiple links and packet switching logic could interface directly with each other and with host systems.
12. Use in a harsh environment which may expose the transceiver to temperature extremes and strong accelerating forces.
13. High energy transfer efficiency.
14. Suitability for use with different optical wavelengths.
15. High rejection of off-axis radiation to prevent interference or overheating when subjected to an intense light source such as direct sunlight.

SUMMARY OF THE INVENTION

The principal object of this invention is to provide a compact, lightweight, self-aligning, yet economical optical transceiver suitable for secure, high bandwidth duplex communication over dispersion limited beams of light through atmosphere, water or free-space for mobile or stationary applications in a line-of-sight environment. Alternatively, the transceiver is suited for convenient replacement of heavy, difficult to route or unsightly cabling in stationary environments. Another object of the invention is to provide an apparatus suitable for independent mode applications such as laser projection and three dimensional imaging. Another object of the invention is to provide a compact, light weight and efficient system of electromagnetic, optical, electro-optical and electronic components capable of discriminating received radiation from transmitted radiation. Another object of the invention is to provide an electromechanism capable of full surround movement relative to the carrier. Another object of this invention is to provide an easily fabricated low profile motor design which can electromagnetically or pneumatically suspend the armature so as to provide the internal components of the transceiver with excellent isolation from shock, eliminate the need for gimbal rings and precision bearings and also provide a mechanism for accurately measuring force in three degrees of freedom. Another object of the invention is to provide a cooled hermetic environment for the internal components of the invention so as to increase the sensitivity of the electro-optic components, the power handling capability and lifespan of the semiconductor components and also to protect the components from damage, user tampering and the mirror surfaces from oxidation. A further object of the invention is to provide an arrangement of components which provide maximum optical aperture for a given spherical space and also area for control, data relay and inertial navigation electronics.

While optical communications and tracking mechanisms exist in the art, these mechanisms may be cumbersome, require manual alignment and may not track accurately if vibration is introduced by the carrier or over a wide range of movement of the carrier. The objects of this invention will allow the transceivers to remain in alignment even though the transceiver may be mobile or unstably mounted. The transceiver will also be capable of full surround movement relative to the carrier.

With the light source modulated using one of the many techniques available in the art, dependent mode transceivers will provide an alternative to radio and microwave links for information transfer. When the modulation is combined with one of the many encoding/decoding techniques available in the art, the transceivers will provide a full duplex data link. Very long range communications may be possible under favorable environmental conditions.

Transceivers may be physically interconnected with each other or other devices using either copper wire or optical fibers. Multiple transceivers may form an optical network node capable of relaying data. Link acquisition and network adaptation may be controlled by either internal or external logic depending upon the configuration.

State-of-the-art design and fabrication will allow the transceivers to be mass-produced at low cost. Small aperture and high power applications may use an external laser source and/or an external electronic module. A mutable object mirror may be used to compensate for optical environmental aberrations.

The advantages of the transceiver derive from the highly directional nature of the electromagnetic wavelengths used and the highly collimated beam possible from an intense point light source, such as is provided by a laser diode, and an optical telescope. Although dependent transceivers may link with diffuse reflection couplings, they typically will not depend upon a wide energy dispersion angle as does most current optical link transceivers and will therefore have a far greater coupling efficiency and potential range. Higher communication bandwidth potential is afforded both as a result of the more efficient coupling and the shorter wavelength of the radiation used.

The transceiver is designed to be usable for electromagnetic radiation in the unregulated infrared or visible range. It will operate without utilizing a valuable shared resource such as a radio or microwave frequency band allocation. The greatly reduced probability of interference may alleviate the need for regulated use of the transceiver provided that it conforms to applicable safety standards.

In typical environments, dependent optical links will be physically secure in that they would be virtually immune to any type of interference which does not intercept the line-of-sight path between the transceivers. However, water or water vapor may diffuse the light beams enough to allow interception by or interference from a nearby device. The low probability of intercept (LPI) transceivers will be particularly valuable to applications requiring a highly secure communications service.

The major optical components of the transceiver comprise a beam expander/compressor, a beam splitter, a laser diode with collimating optics, and a photodiode with converging optics. The electromechanical components of the transceiver comprise two specially designed pancake motors which both electromagnetically rotate and suspend the optical components, a motor with two degrees of translation to vary the position of the photo-diode relative to the other optical components, and a refrigerant pump for an internal cooling system. If the application requires no alignement of carrier mountings, then the transceiver will also comprise a third pancake motor to rotate a optical retardation plate in the compressed beam path and a base motor to provide a course aligning third rotational axis for the optics.

BRIEF DESCRIPTION OF THE DRAWINGS

The objectives of the invention and advantages of other features therein will be more apparent from the following detailed description and the accompanying drawings of the transceiver. Reference is made to the drawings in which.

DETAILED DESCRIPTION OF THE PREFERRED EMBODIMENT

The following sections describe a particular embodiment of the Self-Aligning Optical Transceiver, herein referred to as simply the "transceiver". Variations are possible for several functions of the transceiver. Some variations are noted in the following description but this invention is not limited by this description.

Figure 1:
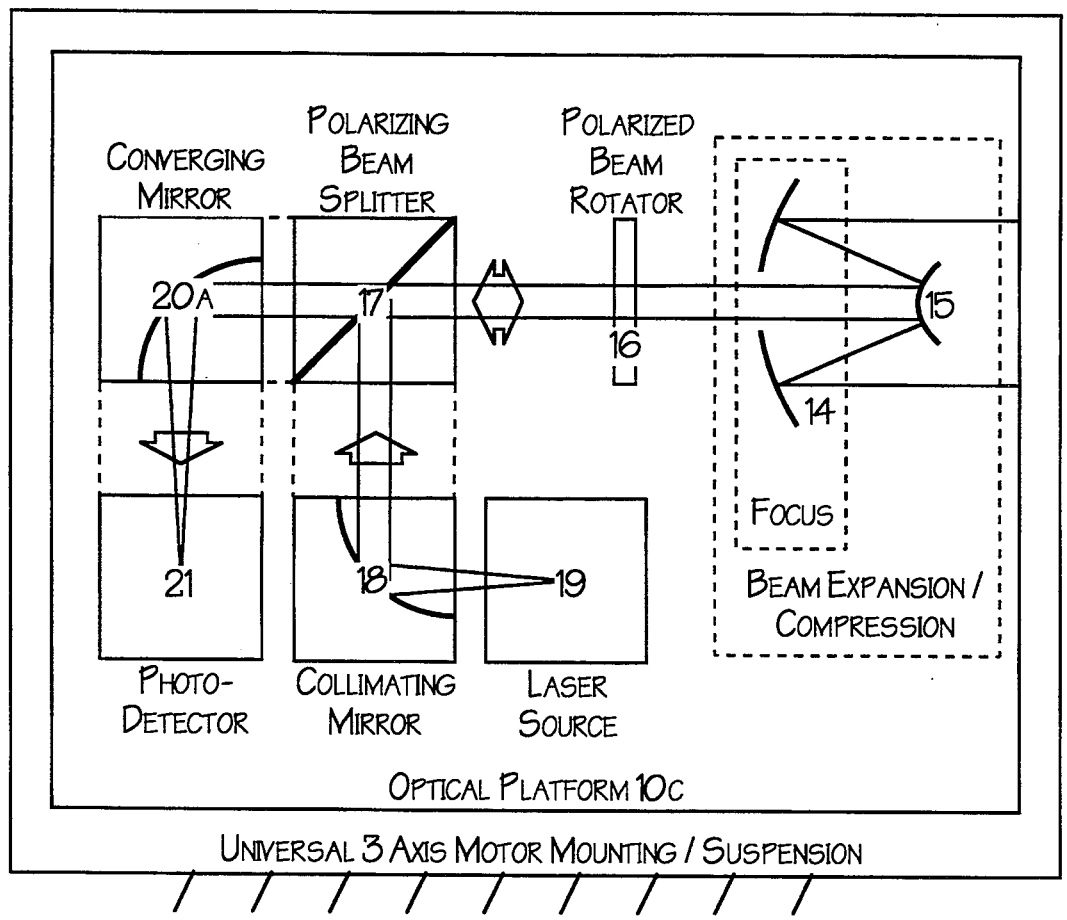
FIG. 1 illustrates a functional schematic of the transceiver.

FIG. 1 illustrates the optical system of the transceiver in accordance with the invention. Received optical radiation permeates free space, atmosphere or water and the transparent shell of the transceiver 7 to reach the concave paraboloidal surface of the object mirror 14. Radiation which is aligned with the axis of the object mirror 14 is compressed toward the convex paraboloidal surface of the beam expander mirror 15 which recollimates the beam. This recollimated compressed beam then passes through a hole in the center of the object mirror 14 and continues to pass through a polarized beam rotating device such as a quarter or half wave retardation plate 16, and then also through a polarizing beam splitter 17. The beam expander/compressor formed by the combination of the object mirror 14 and the convex mirror 15 is hereafter referred to as the telescope.

The beam splitter 17 will allow the component of radiation received in one plane of polarization to pass straight through to the concave mirror 20a which will converge the light onto the photodetector 21 which, for the preferred embodiment, is a sensitive single element PIN or Avalanche photodiode. The beam splitter 17 will reflect radiation received in the other plane of polarization 90° onto the laser collimating mirror 18 and into the laser diode 19 where it is dissipated as heat.

A polarizing beam splitter 17 is used to take advantage of the highly polarized (>99%) nature of the semiconductor laser diode source 19 emission to separate received radiation from transmitting radiation with high efficiency. Polarizing techniques also provide insensitivity to the optical wavelength used. Emissions from the laser diode 19 are collimated by the laser collimating mirror 18 and are almost entirely reflected 90° by the beam splitter 17 towards the telescope 14 & 15.

Due to the design criteria of not requiring carrier alignment, two dependent transceivers could emit light with similar polarization which would make the received radiation difficult to separate from the transmission radiation. Therefore the transceiver uses a phase retardation plate 16 to enable rotation of the polarization of the transmitted beam. This retarder 16 is rotatable by a separate pancake motor with stationary windings 10d and armature plates 25, shown in FIGS. 9 and 10, to enable a transceiver to dynamically change the polarization mode of its transmitted beam for maximum efficiency. The transmission efficiency will be optimal when the transmitted beam polarization is orthogonal to the received beam polarization.

Figure 3:
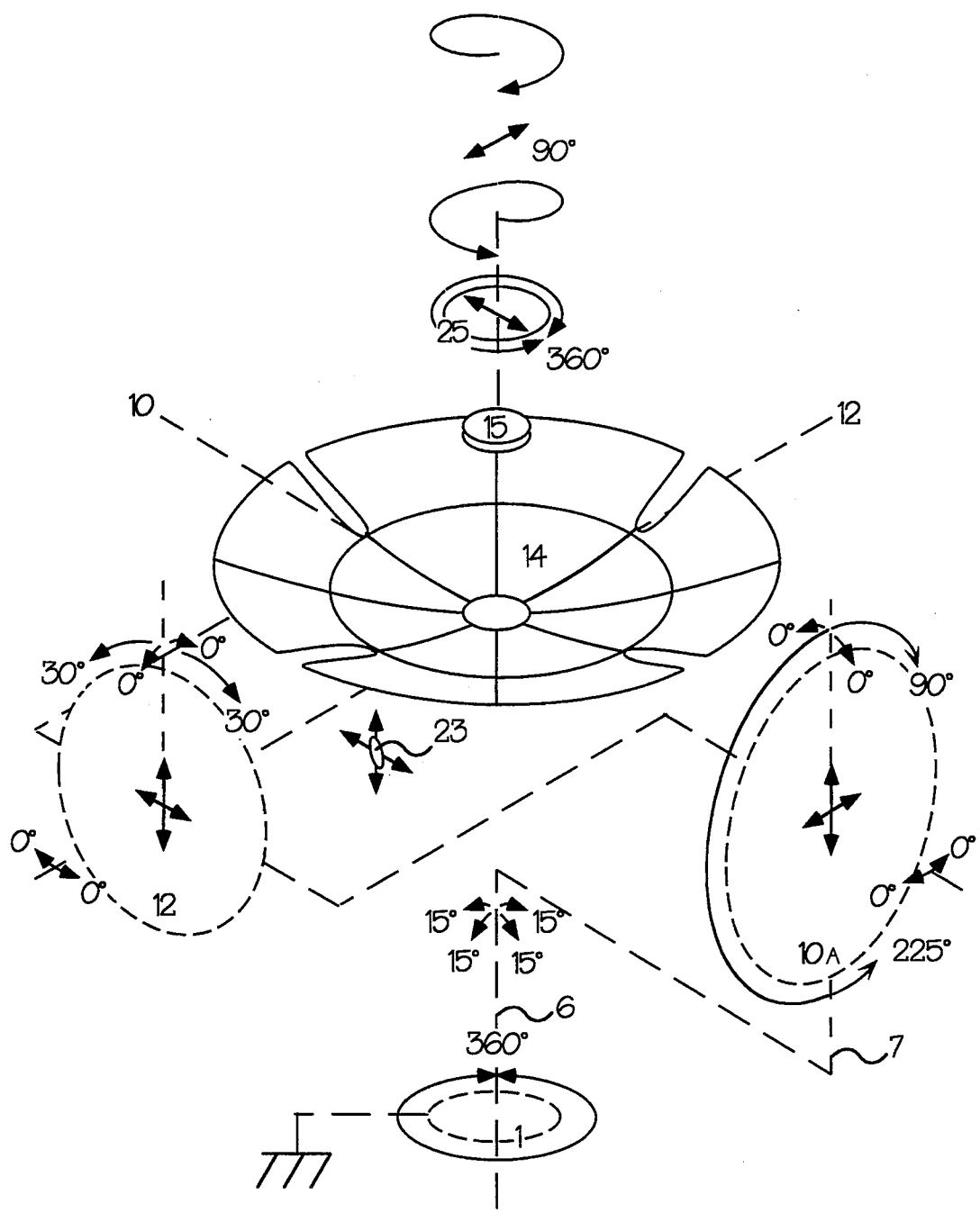
FIG. 3 illustrates a mechanical schematic of the transceiver suspension and beam rotator motor movements from a perspective that aligns with that of FIG. 11.

The retardation plate 16 may be either quarter or half wave. Both types of retardation will enable dependent mode operation, however, one type may be preferred depending upon whether or not the detection of reflected radiation is desirable for the application. A quarter wave retarder would enable the transceiver to emit light circularly polarized in either direction or linearly polarized in either of two orthogonal planes. It would be used for applications where detection of a reflected beam is desired. A half wave retarder would enable the transceiver to smoothly rotate the beam's plane of polarization while remaining linear. Linear polarization is preferable for applications where elimination of possible interference from a reflected beam is desired. Both linear and circular polarization modes are illustrated in FIG. 3. A first order retardation plate is preferred for insensitivity to temperature and wavelength.

Figure 2:
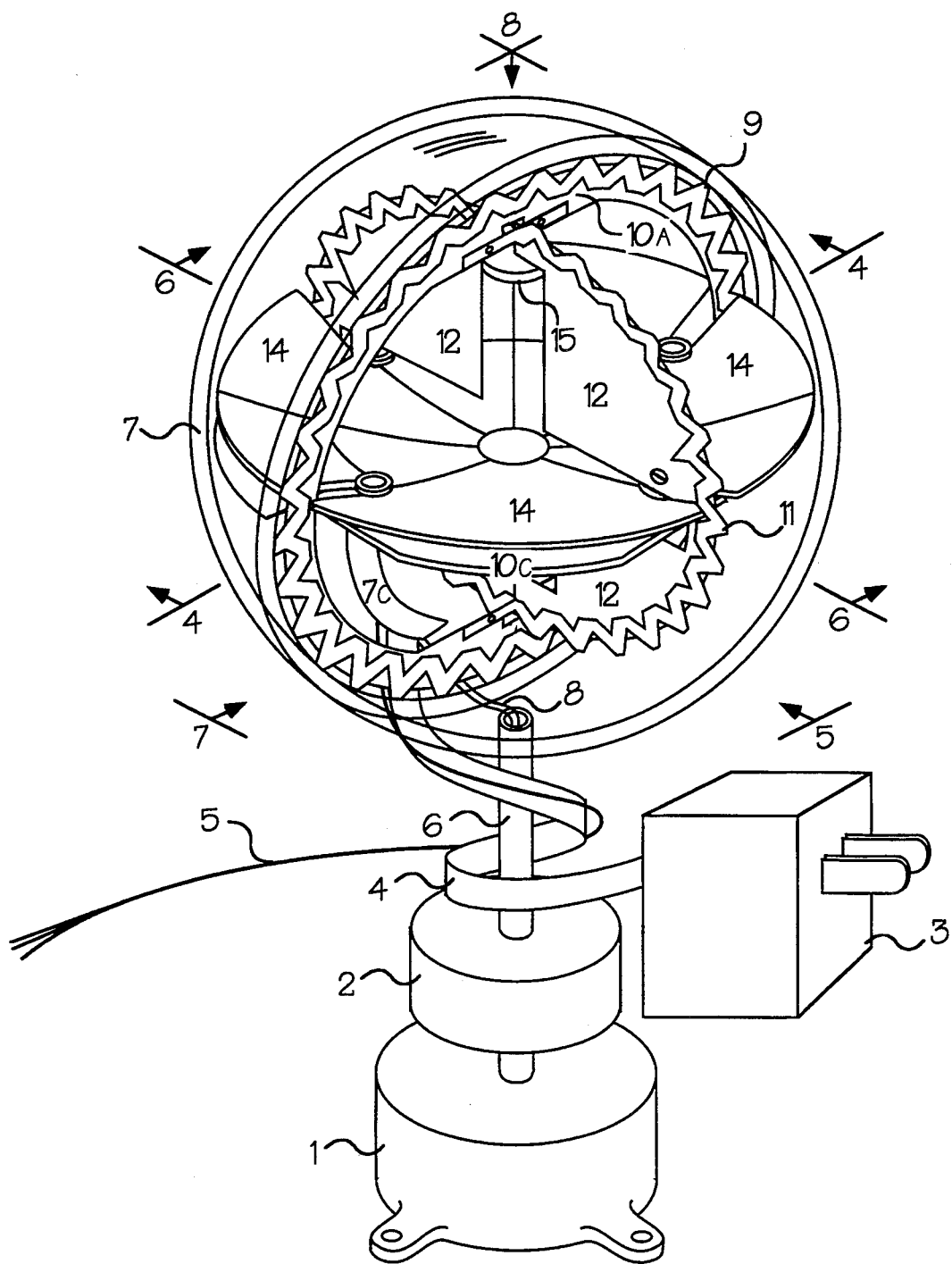
FIG. 2 illustrates an isometric overall view of the transceiver drawn at a typical size.

FIG. 2 illustrates the overall construction of the transceiver. The transceiver's optical components are supported by a rigid optical platform 10c. This optical platform 10c is supported within and at a right angle to the armature 12 of an inner pancake motor which also directly supports the beam expanding mirror 15. This pancake motor armature 12 supports itself electromagnetically from its stator plates 11 which are attached at right angles to the armature 10a of a larger diameter outer pancake motor. This outer pancake motor armature 10a supports itself electromagnetically from its stator plates 9 which are embedded at its outer circumference in the spherical transparent housing 7. This transparent housing 7 is, in turn, supported by a flexible shaft 6 which may be rotatable by a servo or stepper base motor 1 which is mounted to the carrier system. This mechanical arrangement of motors is described in more detail for FIG. 3.

Alternatively, the pancake motor armatures 10a and 12 may be supported pneumatically from their respective stators 9 and 11 by small refrigerant evaporation jets placed in the stator plates and only rotated electromagnetically (not shown). This alternative would be more complex mechanically but would be more power efficient and would provide additional cooling for the armatures 10a and 12.

The transceiver's optical platform 10c supports a phase retardation plate 16 electromagnetically, a laser source 19, an object mirror 14 and an optical housing 20 directly. This optical housing 20 in turn supports a polarizing beam splitter 17, a laser collimating mirror 18, a beam converging mirror 20a and a photodetector translation motor 23. This photodetector translation motor 23 in turn supports the photodetector 21 while providing two degrees of translation.

The optical axis of the object mirror 14 lies nearly in the dihedral formed by the inner and outer pancake motors. This allows the two pancake motors to rotate the opticsl axis in any direction and thus finely steer the transmission beam. A third pancake motor of design similar to the inner and outer motors is used to suspend and rotate a phase retardation plate 16, herein referred to as the beam retarder, as described for FIG. 1.

The transceiver has a closed internal environment in communication with a mechanical refrigeration system. A cooling unit 2 contains a compressor and condenser/heat exchanger coils. Alternatively, the condenser coils may be partially embedded in the spherical shell 7 in order to warm the shell. These components are not illustrated, as any suitable commercially available components may be used. The cooling unit 2 is separated from the spherical shell 7 by a flexible hollow supporting stem 6 which contains interconnecting wires and a portion of a small flexible high pressure tube 8. This stem 6 could be varied in length for different applications and, in some cases, angled to provide the transceiver with full encirclement visibility about a small carrier system.

The internal environment is evacuated and a small amount of a low pressure inert refrigerant, e.g., R 11, is added just prior to sealing. The compressor will draw heated refrigerant vapor from the spherical portion of the transceiver through the stem 6, compress the gas into the heat exchanger where it is condensed into liquid form, cooled and then returned to the cooled components through the tube 8. Heat from the condenser is dissipated by conduction through either the spherical shell 7 or the base mounting.

Cooling of internal transceiver components is desirable for a number of reasons:

The transceiver may be exposed to direct radiation from the sun.

The internal suspension will not provide heat sinking by conduction.

The photo-diode dark current noise decreases by approximately a factor of 10 for a temperature decrease of 40° Celsius thus improving its sensitivity.

The laser diode may be operated at a higher power level, more stably and with a longer lifespan if cooled.

Most semiconductor components are more stable, can be clocked at a faster rate and will exhibit a longer lifespan when cooled.

The piezo-ceramic components must be kept below some critical temperature in order for the material to not lose its polarization and become ineffective.

The use of a low pressure refrigerant eliminates the need for a thick spherical housing to withstand high internal vapor pressures but limits the cooling available at the expansion jet 26 to about 5° Fahrenheit (F.). The common refrigerant R-11, Trichloromonofloromethane ($C Cl_3 F$) typically operates with a low side vacuum of 24 inches of mercury at 5° F. and a high side pressure of 3.6 pounds per square inch above atmospheric (psig) at 86° F. R-11 generates only 10 psig (24.7 psia) at 100° F. If necessary, the photo-diode 21 may be further cooled by a small thermoelectric cooler.

The spherical part of the transceiver has a protective shell 7 which is radiation permeable and is molded into two hemispheres of a durable transparent material such as polycarbonate (LEXAN). The shell 7 is warmed above ambient temperature by either fine heater wires (not shown) or by partially embedded condenser coils to prevent condensation and accumulation of snow or ice on the shell. Heating the shell 7 will compensate for the cooling of the interior surface by the flow of refrigerant vapor. The spherical shell 7 will be capable of withstanding approximately one atmosphere of either positive or negative internal pressure relative to the environment.

The base motor 1 complements the limited (~60°) range of rotation of the inner pancake motor 11 & 12 to provide full surround alignment capability of the telescope relative to the carrier. This motor 1 is external to the hermetically sealed environment of the transceiver and several commercially available designs may be used. Logic will control the base motor 1 so as to keep the transmission beam nearly in the plane of the outer pancake motor. This will reduce its shadow on the object mirror 14 and keep the inner pancake motor 11 & 12 well within its range of motion.

A flexible cable 4 interconnects the transceiver with an external power supply 3 while a fiber optic bundle or ribbon 5 interconnects the transceiver with similar transceivers or host computers or both. The cables are coiled around the supporting stem 6 in order to allow the transceiver shell 7 to turn full circle relative to the carrier. The external fiber optic bundle 5 and power supply cable 4 are illustrated entering the hermetic housing at connectors molded into one shell hemisphere 7. Alternatively, the cables may be coiled around the base motor 1 shaft between the motor 1 and the cooling unit 2 and brought into the hermetic environment through the cooling unit 2.

Twisted copper wire pairs 5 alternatively may be used for external data links, but optical fiber pairs are preferred for higher bandwidth and for both electrical and electromagnetic isolation. The number of optical fiber or twisted wire pairs 5 required for external data links may depend upon the transceiver configuration. A transceiver with packet switching capability may use three or four pairs of multi-mode fibers for the data links. This would allow for considerable redundancy and flexibility in interconnecting the transceivers to form an optical network node. For applications requiring more power than would be available from an internal laser diode, a single mode fiber may be used as a waveguide for an external laser.

An external power supply 3 will adapt the power source to the filtered low voltage direct current source as required by the transceiver electronics. The unit will typically contain a small battery to maintain the control logic memory while the power supply is disconnected from its source. Multiple power supplies may be designed to operate on battery, U.S. standard power (110–120 volts at 60 Hertz), aircraft power (110–120 volts at 400 Hertz or 16–28 VDC) and European standard (230 volts at 50 Hertz).

Motor control and other logic will require a regulated low voltage power supply. The photodiode and piezoelectric components will require a high voltage supply, e.g., 300 volts, but at a nominal current. This supply may be an internal DC—DC converter (not shown) occupying a space of less than 1 cubic inch.

FIG. 3 illustrates the relative freedom of motion for the optical platform 10c and telescope 14 & 15 resulting from the combined motions of base motor 1, the flexibility of the supporting stem 6 and the pancake motor armatures 10a & 12. It also illustrates the relative motion of the photodetector 21 by the translation motor 23 and various polarization modes possible from the combination of the retarder 16 and the retarder pancake motor armature 25 as described for FIG. 1.

The base motor 1 armature rotation is limited by the wrapping of the cabling 4 & 5 around the stem to ~360° in either direction from a center position. For some applications, the transceiver may not be able to continuously track another device with this limitation. The rotation could be made unconstrained through the addition of electrical and optical slip rings. A custom base motor 1 or a custom compressor motor design could allow power to be induced to the transceiver through the motor's windings. The base motor 1 may be replaced by a simple mechanical forward/reverse transmission driven by the compressor motor.

In another embodiment (not shown), the base motor 1 or mechanical transmission may be enclosed within the base of the spherical shell 7 and rotate the outer pancake motor directly wherein the outer pancake motor stator 9 would pivot within the shell 7 rather than be rigidly attached to it. This embodiment would have the advantage of not requiring the shell to rotate relative to the carrier mounting. The shape of the shell 7 could be distorted from spherical for less wind resistance to the extent that the mutable mirror could correct for the additional aberrations.

In another embodiment (not shown), the compressor motor may also be enclosed within the base of the spherical shell 7 or the compressor motor may be partially enclosed within the shell 7 with the armature and secondary power transformer windings being driven by an external stator. A motor designed in this manner used in conjunction with fiber optic data links would provide electrical isolation to the housed components as may be necessary to prevent transceiver damage from lightning. The design would also facilitate easy modification of the stator for operation at different voltages and frequencies.

In yet another embodiment (not shown), two or more transceivers may share a common housing. The housing would be elongated or otherwise expanded to accommodate the multiple transceivers. This multiple transceiver embodiment would have the advantage of less wind resistance than separate transceiver embodiments. It would also be more economical by allowing resources to be shared between the transceivers such as the compressor, compressor motor, power supply, controlling logic and data links.

The shell 7 supporting stem may be allowed to bend as much as 15° in any direction. The outer pancake motor armature 10a is limited to ~315° of rotation relative to the shell 7 while the inner pancake motor armature 12 is limited to ~60° of rotation relative to the outer motor armature 10a. The retarder motor armature 25 rotation is unconstrained.

Controlling logic or pneumatic pressure will actively constrain the pancake motor armatures 10a & 12 to remain exactly centered between the corresponding two stator plates 9 & 11 as will be described in the section Operation of the Invention, but the armatures will have some freedom of movement within the plane of the motor. An off-center condition within the armature plane will generate a centering force which controlling logic may vary to prevent resonating. In combination, the two motor suspensions will effectively isolate the telescope optical platform from carrier vibration.

Motor 23 operates to translate the position of the photodiode 21 in the focal plane relative to the optical housing 20 such that the diode 21 can be quickly and accurately aligned with the focused received beam. This motor will enable transceiver logic to rapidly scan a small area of the telescope field of view for detecting reflected radiation or radiation from another device. Once detected, the position of the photodiode 21 is continually varied to keep the diode's active area centered about the focal point of the received radiation. The translation motor 23 will also allow the transceiver to protect the photodiode 21 from intense light by moving the diode 21 behind the opening of a light baffle 18. Operation of the photodiode translation motor 23 is further described in the section Operation of the Invention.

FIGS. 4, 5, 6, 7, and 8 illustrate the spherical portion of the transceiver from three orthogonal elevations and two orthogonal cross sections as referenced from FIG. 2. These figures are referred to collectively in order to describe the internal geometry of the transceiver.

Mirrors 14, 15, 18 & 20a are used for the optics rather than lens for high transmission efficiency, insensitivity to wavelength, mutability, low weight and also so that most radiation received off-axis is reflected back out of the transceiver. Front surface mirrors are used to eliminate distortion as the surface is protected from oxidation by the hermetic inert environment.

Figure 8:
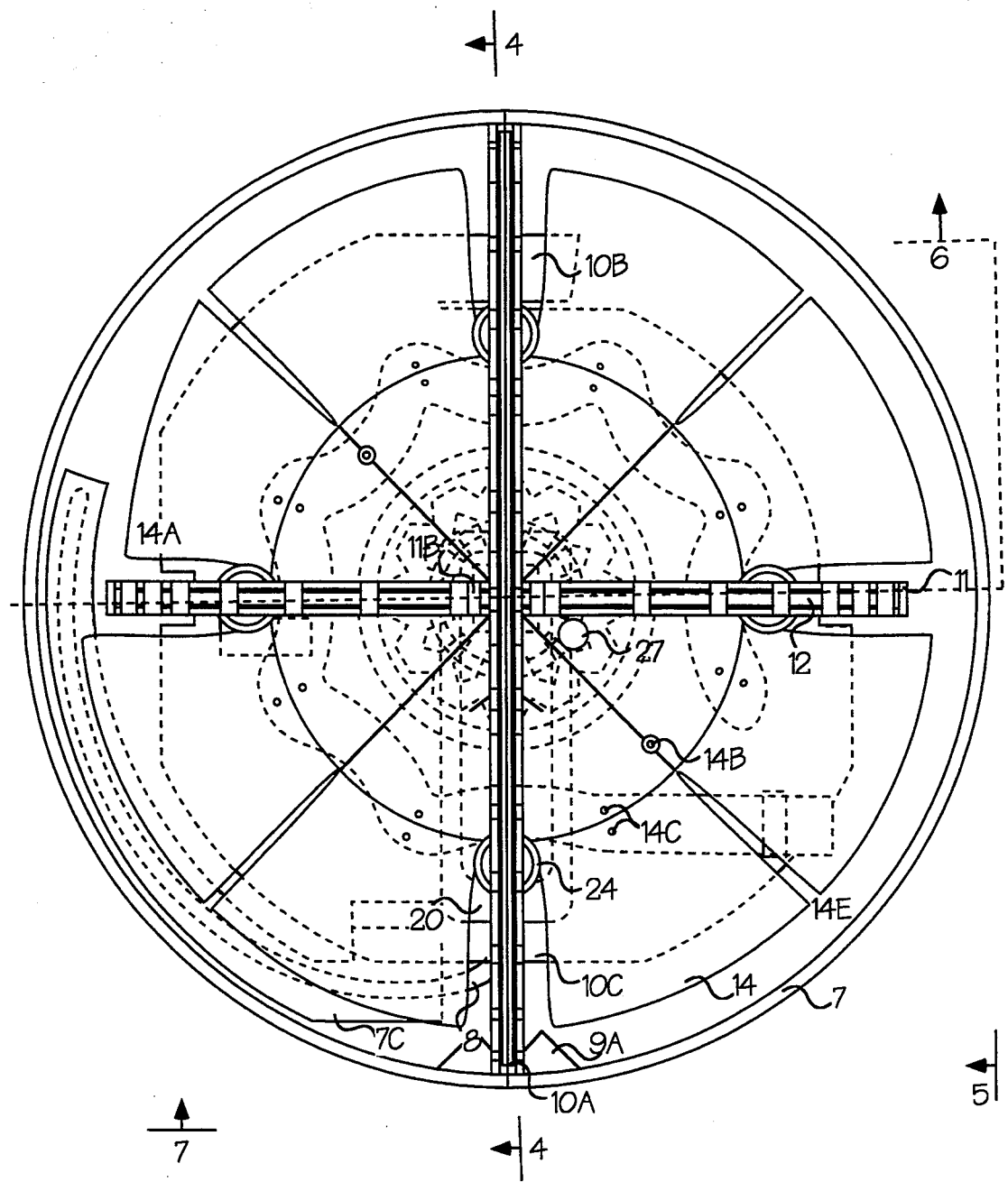
FIG. 8 is a plan view of the transceiver which aligns with the optical axis as illustrated. This view best illustrates the outline and sectioning of the object mirror.

The telescope consists of a paraboloidal concave object mirror 14 and a paraboloidal convex mirror 15. The object mirror 14 is positioned near the center of the spherical shape both for balance and for maximum aperture in the given space. It should be molded so as to pre-compensate for spherical aberration from the shell and possibly also for a mean aberration expected of the operating environment, such as water or the aerodynamically shaped canopy on an aircraft wing tip. A section of the mirror 14a is shortened both for assembly and for clearance with the power connector cable 7c and refrigerant tube 8 as shown in FIG. 8. The polished silver surface of the mirror 14 will serve as both an excellent electrical conductor and reflector of infra-red light. The mirror 14 may have a fixed focus for inexpensive short range applications or it may be mutable to enable compensation for focus and environmental aberrations.

Figure 4:
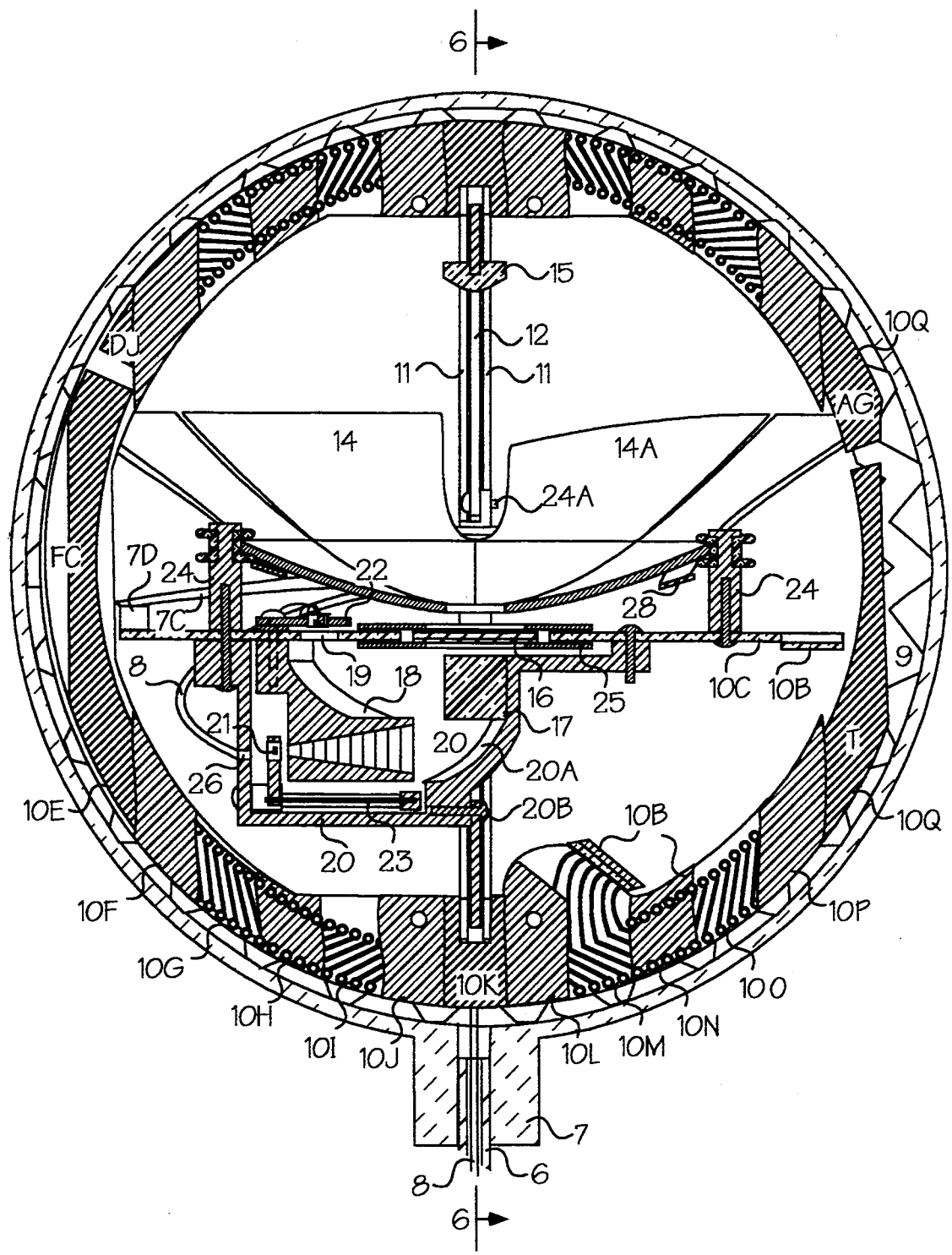
FIG. 4 illustrates a cross-sectional view of the transceiver which dissects the outer pancake motor of the transceiver at a skew to show a portion of the two stationary magnetic plates and all layers of the outer motor armature. This figure best illustrates the motor armature lamination and the configuration of the optical components.

Referring to FIG. 4, an optical housing 20 internally supports the polarizing beam splitter 17, the refrigeration jet 26 and the photodiode motor 23. The housing 20 also has an internal concave off-axis paraboloidal surface 20a which is silver electroplated to form the converging mirror 20a that will focus received radiation onto the photo-diode 21 active area.

The collimating mirror 18, also molded of plastic, is mounted to the optical platform 10c and entirely contained within the optical housing 20. Similar to mirror 20a, this collimating mirror 18 has a silver electroplated concave off-axis paraboloidal surface to collimate the light from the laser diode 19 towards the beam splitter 17. This mirror surface 18 may be molded so as to compensate for the astigmatism of the side emitting laser diode 19. This mirror 18 also has a cone with an internal serrated surface for absorbing light entering the optical cavity off-axis from the telescope 14 & 15.

The photodetector 21 may be a sensitive single element PIN or Avalanche PhotoDiode with an active area slightly larger in diameter than the received beam waist at the focal point. As described for FIGS. 1 and 3. The photodiode 21 is mounted to a motor 23 which has two degrees of translation to allow its active area to be rapidly scanned over a small area of the receive focal plane. This motor 23 may be constructed using two piezo-ceramic bimorph strips.

Figure 5:
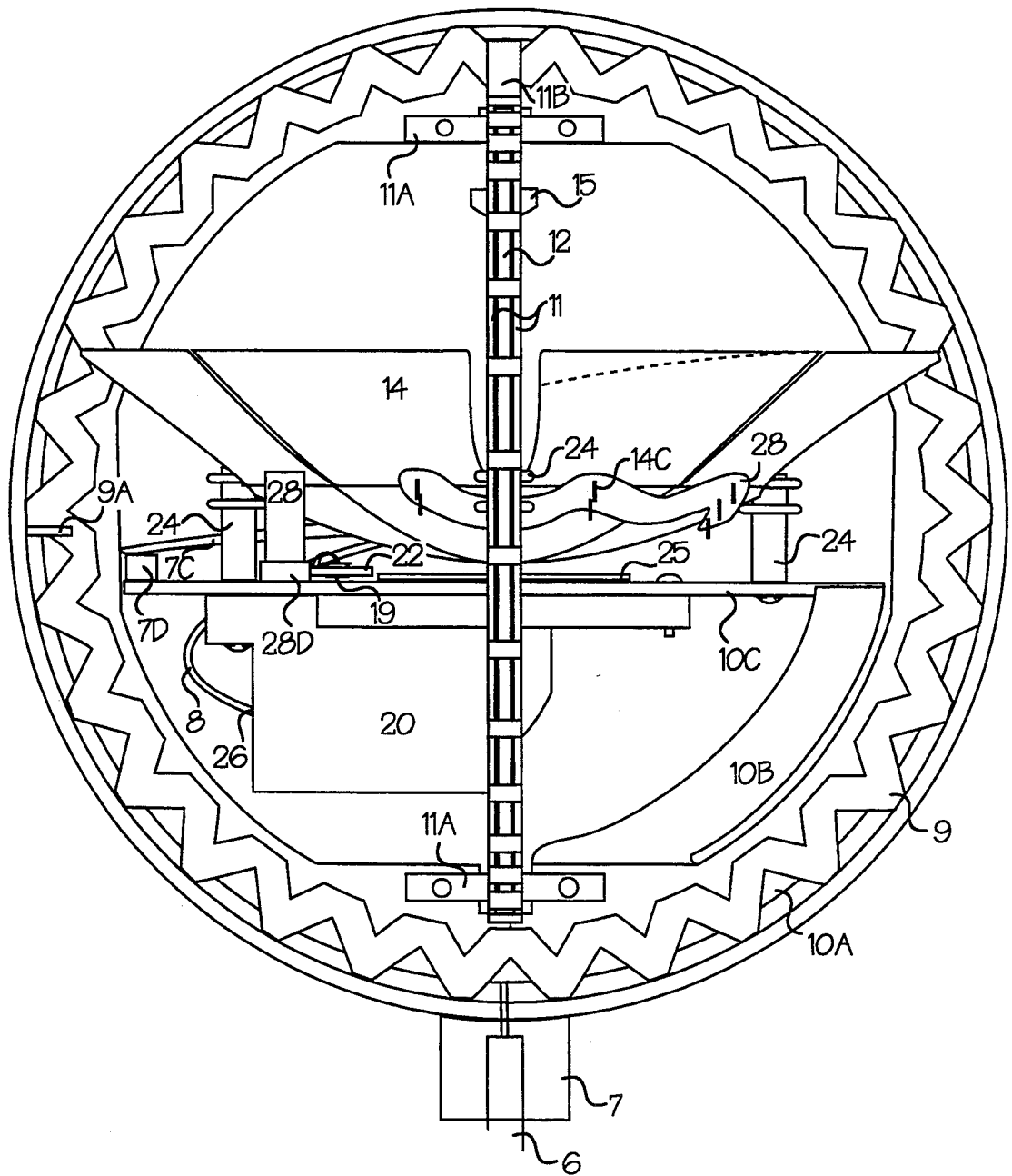
FIG. 5 is an elevation view of the transceiver aligning with the axis of the outer pancake motor.
Figure 9:
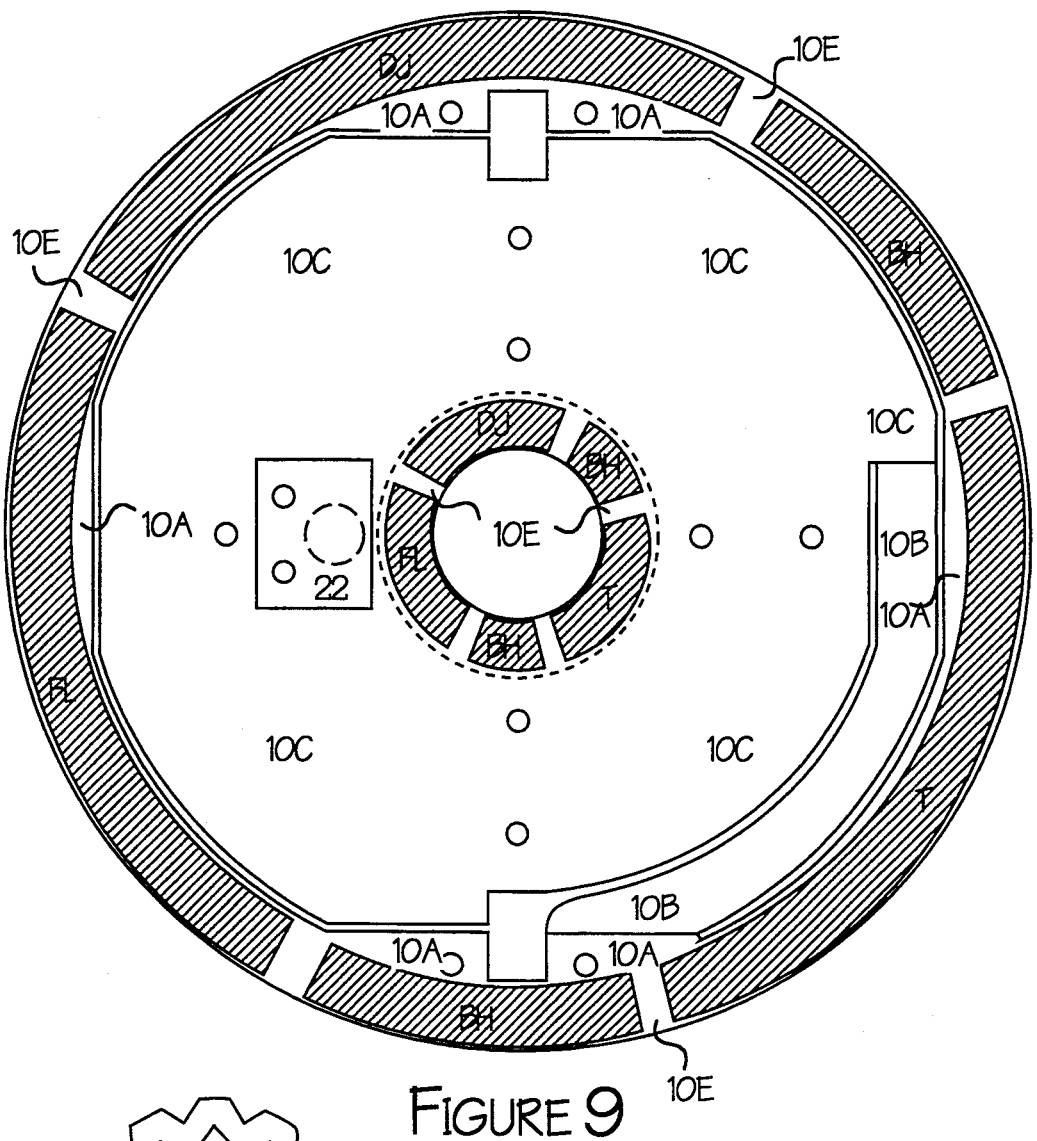
FIG. 9 is an elevated view of the main Printed Circuit Board (PCB) which forms the outer pancake motor armature, the optical component platform and the retarder motor stationary windings.

As shown in FIGS. 5, and 9, a side emitting laser diode 19 is mounted in a heat sink plate 22 which, in turn, is mounted with adjusters to the optical platform 10c. This plate 22 will dissipate heat from the laser diode 19 by convection to the flow of refrigerant vapor.

Referring to FIGS. 4 and 5, the closed internal cooling system is completed by a flexible high pressure return tube 8 which carries liquid refrigerant from the compressor and condenser coils near the transceiver base to an evaporation jet 26. This evaporation jet 26 is located near the photo-diode 21 in order that it will be made very cold in operation as is desired to reduce thermally induced background noise and thus increase the sensitivity of the transceiver. Vapor refrigerant returning to the compressor flows through the optical housing 20, then through the laser diode mounting 22 and then along the inner and outer pancake motor armature surfaces 10a & 12 cooling the mounted semiconductor components.

All three pancake motors have a similar structure. One outer pancake motor stator ring 9 is partially embedded, at the outer circumference of the ring, just below the rim of each shell hemisphere 7. When the two hemispheres are sealed together, the two stator plates 9 straddle the outer motor armature ring 10a with a small clearance. Two inner motor stator half rings 11 are mounted perpendicular to both sides of the outer motor armature ring 10a via mounting tab extensions 11a (shown in FIGS. 2 and 5) so as to wrap around both sides (or straddle) the inner motor armature 12.

Figure 6:
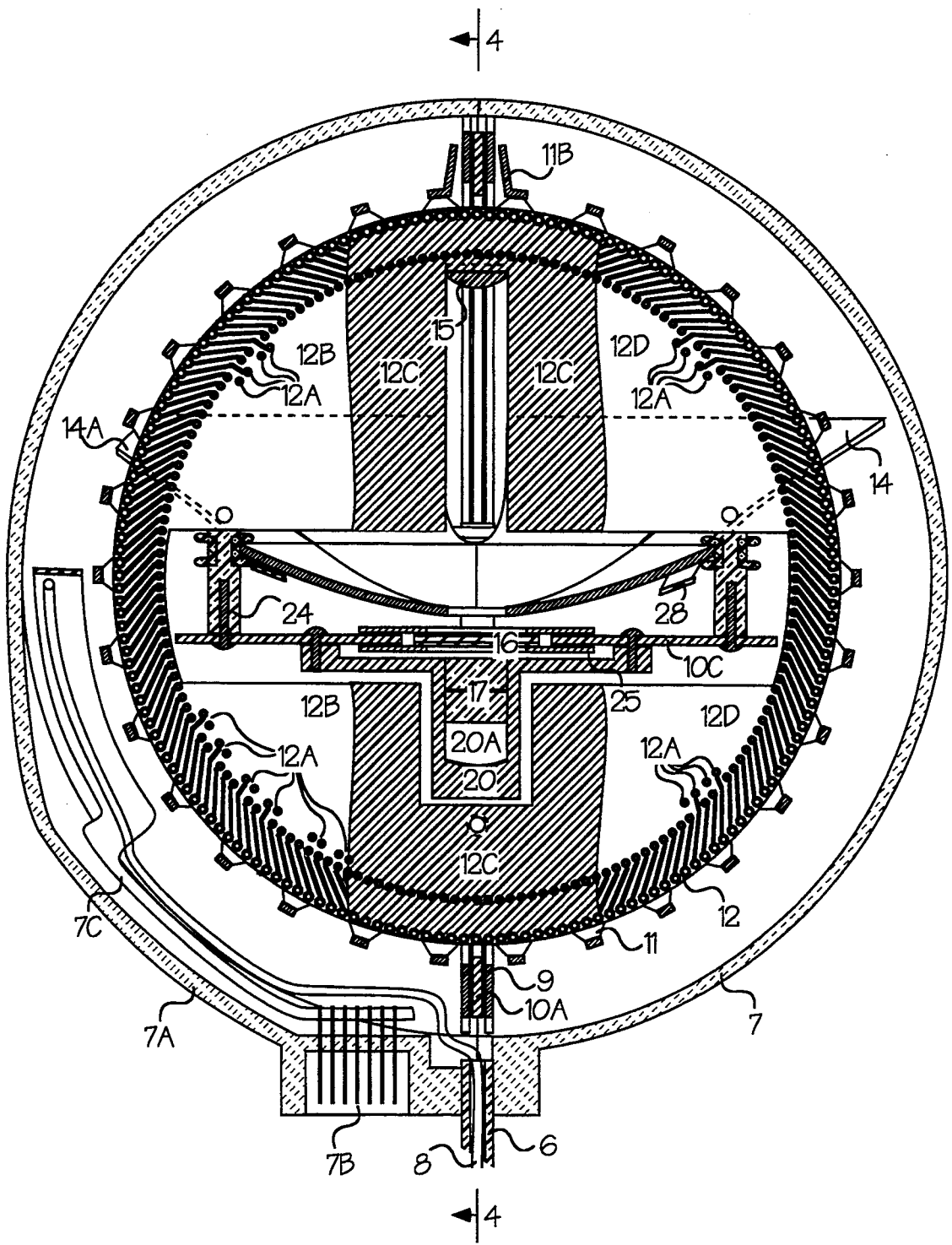
FIG. 6 illustrates a cross-sectional view of the transceiver which dissects the inner pancake motor at a slight skew to show three layers of the motor armature in greater detail.
Figure 7:
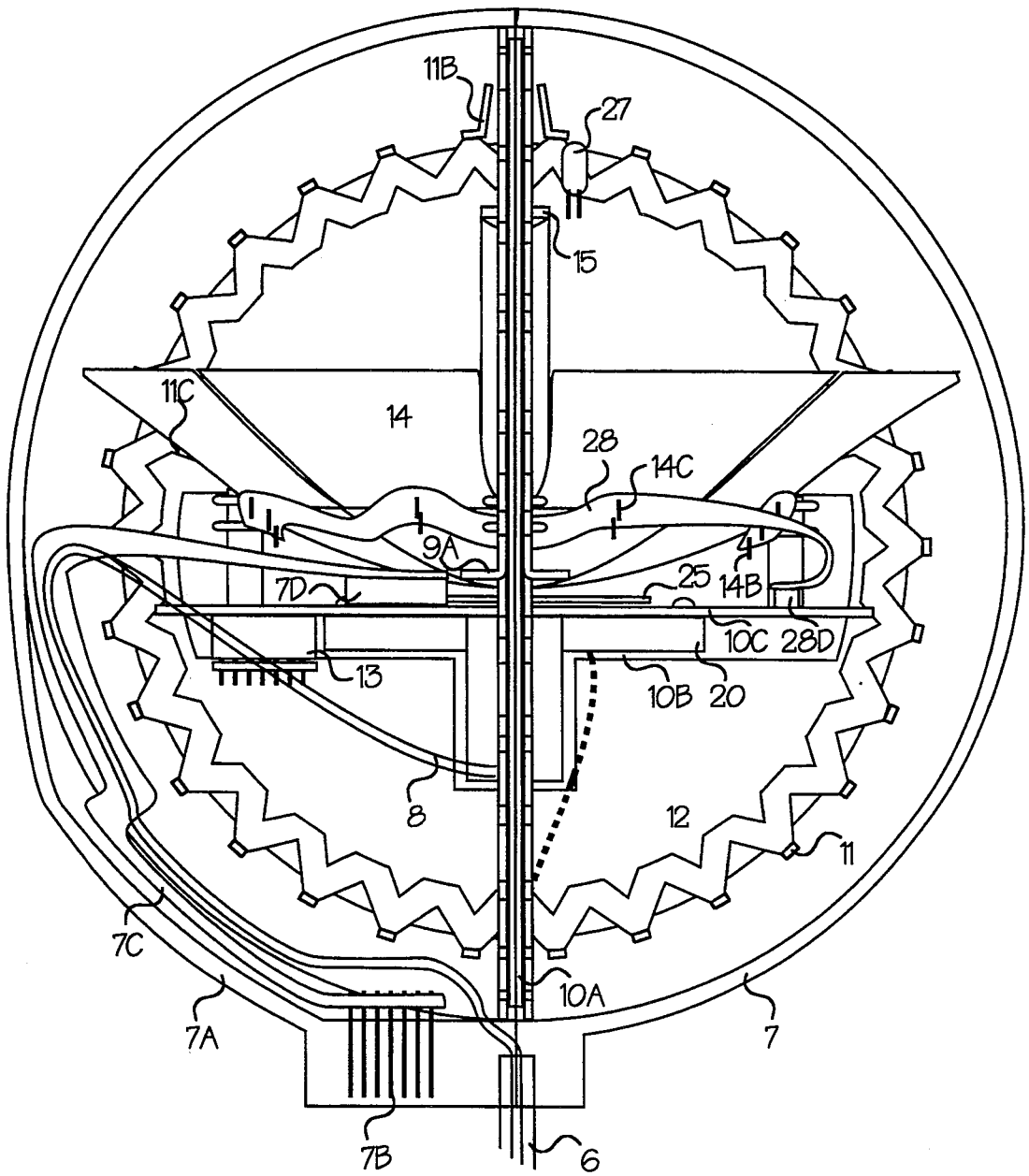
FIG. 7 is an view of the transceiver elevated along the axis of the inner pancake motor.

Referring to FIGS. 6 and 7, a flexible cable 7c with electrical connector 7d interconnects the power cable connector pins 7b, which are molded into the spherical protective shell 7, with the optical platform 10c. A possible location on the shell for fiber optic data link connectors is suggested by 7a. Optionally connectors 7a and 7b may be provided in the cooling unit housing 2 which is shown in FIG. 2.

The inner motor armature PCB 12 is entirely rigid and also has area for surface mount integrated circuits in addition to the armature windings for the inner motor. This PCB 12 has a center area cut out to provide clearance for the compressed transmission and received beams, the optical platform 10c and the object mirror 14 which both pass through the PCB 12 at a right angle. The construction of the inner motor armature PCB 12 is similar to that of the main PCB 10 which becomes the outer motor armature 10a and the optical platform 10c as described for FIG. 9.

The outer and inner pancake motors 9 & 10a and 11 & 12 both have mechanical limit stops to prevent damage to the flexible cables 7c and 10b and the thin object mirror 14. The inner motor stator half rings 11 each have an extension 11b which will interfere with a small upset area of an outer motor stator plates 9a to limit the outer pancake motor movement and also have an extension 11c which will interfere with the optical platform 10c to limit the inner pancake motor movement.

The optical platform 10c is fastened to the inner motor armature PCB 12 at a right angle by an electrical connector 13 (shown in FIGS. 5 & 7), and indirectly supported through the molded optical housing 20 and two object mirror support posts 24 by screws at points 24a. The optical platform 10c is oriented perpendicular to both the inner motor armature PCB 12 and the telescope optical axis and directly supports the object mirror 14. In operation, the inner pancake motor armature 12 rotates the optical platform 10c between 60° and 120° from the plane of its outer motor armature ring 10a.

The optical housing 20 is molded of a durable plastic and mounted to the optical platform 10c opposite the object mirror 14. Together with the optical platform 10c the housing 20 forms an optical cavity to eliminate stray radiation from the photodiode 21. The housing 20 provides mechanical support for the optical platform 10c by a screw at point 20b affixing it to the inner motor armature PCB 12 as described herein above. The exterior of the housing 20 may be metal clad to reflect unwanted radiation back out of the transceiver.

The object mirror 14 is supported from the optical platform 10c by four mounting posts 24 with rubber grommets. The convex mirror 15 is supported directly above the center of the object mirror 14 by the inner motor armature PCB 12.

Referring to FIGS. 7 & 8, a beacon light emitting diode (LED) is mounted to the inner motor armature PCB 12 in order to simplify acquisition of a dependent mode link as described in the section on Operation of the Preferred Embodiment.

FIG. 9 is a plan view of the main printed circuit board (PCB) 10 as it would appear prior to assembly. This view also illustrates the laser diode mounting plate 22 which is attached to the main PCB 10. Since both motor armature PCBs 10 & 12 have similar construction, reference is made to the main PCB in the following description.

The main PCB 10 is fabricated with both rigid and flexible areas using techniques available in the art. The main PCB 10 is then cut to form two rigid areas 10a & 10c which remain connected by the flexible cable section 10b. This flexible section 10b will carry current from drivers on the center area 10c to the twelve phase outer motor armature windings in the remaining ring 10a. The main PCB 10 is shown in FIGS. 4, 5, 6, 7 and 8 with the center area 10c rotated 90° from the outer motor armature winding ring 10a to form the optical platform 10c.

The optical platform 10c provides stationary windings 10d partially visible under lands 10e for a third pancake motor which is used to rotate a mica or quartz quarter or half wave retarder 16 relative to the optical platform.

Figure 10:
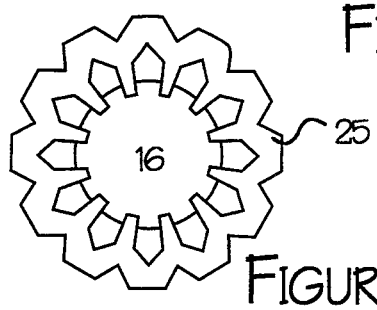
FIG. 10 is an illustration of one of the two magnetic plates forming the retarder motor armature.

Copper lands T, BH, DJ & FC are correspondingly etched into the electroplated cover layer 10e for both the outer pancake motor armature ring 10a and the retarder motor stator 10d. Opposite to lands T, BH, DJ & FC are corresponding lands T, AG, Cl & EK which are etched into the cover layer 10q on the opposite side of the main PCB 10 for both motors. These lands cover the pancake motor windings, partially shown in lower layers of the PCB 10, to form variable capacitors with the outer motor stator rings 9 and with the retarder motor armature rings 25, as illustrated in FIGS. 5, 7 and 10, which will enable logic to accurately determine an off-center condition as will be described for FIG. 11. Similar lands are etched into the inner motor armature PCB 12 cover layers which are not shown as the operation of the inner pancake motor is identical to that of the outer motor.

A possible lamination technique for the armatures is illustrated by the slightly skewed sections in FIGS. 4 and 6. In FIG. 4, the outer motor armature ring 10a is sectioned such that the PCB center layer 10k is in the middle of the drawing with all successive layers above the center layer 10j, i, h, g, f & e shown to the left and all successive layers below the center layer 10l, m, n, o, p & q shown to the right. In FIG. 6 the inner motor armature 12 is sectioned so as to illustrate in greater detail the three layers which form one winding lamination. FIG. 6 also illustrates phase endpoints and crossover holes 12a.

Referring to FIG. 4, one single winding lamination 10g, h & i and another single winding lamination 10m, n & o are shown, for convenience in illustration, on each side of the magnetic center layer 10k, however, multiple winding laminations may be required on both sides of the magnetic center layer 10k in order to carry sufficient current for suspension.

A center lamination is formed by bonding dielectric layers 10j & l to both sides of a magnetic plate layer 10k. The magnetic plate 10k (e.g., steel) is first drilled so as to not short circuit pass-through holes created later in the lamination process.

Two prepreg dielectric layers 10h and 10n are drilled for winding pass through holes, then copper electroplated and etched both sides to form the winding layers 10g, i, m & o. The two winding laminations are then bonded to both sides of the center lamination 10j, k & l. Two additional dielectric layers 10f & p are then bonded to both sides of the lamination. The overall lamination (11 layers) is then drilled for layer interconnecting pass through holes, e.g., 12a in FIG. 6, electroplated both sides (13 layers) and finally the cover plate layers 10e & q are etched for the motor lands and for surface mount integrated circuits (not shown).

For encoding displacement, the two inner and outer pancake motor stator rings 9 & 11 and the retarder motor armature rings 25 are zigzag cut from a magnetic material, e.g., steel, so as to fully cover half of the phase windings on both sides of the PCBs 10a & 12 with a small clearance. A current in a partially uncovered phase winding will attract an edge of the ring's zigzag shape and generate a torque about the perpendicular axis of the motor. Similarly, if the armature axis is off-center from the stator, then a centering force will be generated from the two partially uncovered phase windings on both sides of the PCB.

Alternatively, the zigzag shapes may be omitted from the inner and outer pancake motor stator rings 9 & 11 to enable pneumatic suspension or where the application does not require motor logic to encode the displacement. In this case, the motors would generate torque against the magnetic reluctance of the stator plates by rapidly rotating the armature phases.

FIG. 10 illustrates one of two magnetic plates 25 which, together with the retardation plate 16, form the retarder motor armature. The plates have a zigzag shape similar to the inner and outer motor stators 9 & 11, but also have extensions toward the center for affixing to the retarder plate. The two plates 25 straddle the center hole of the optical platform 10c with a small clearance and each partially covers the motor windings 10d and capacitor lands 10e & 10q as shown in FIGS. 4 and 6.

Operationally, the retarder motor differs from the inner and outer pancake motors only in that the roles of armature and stator are reversed. The optical platform PCB 10c with motor windings 10d suspend the two armature magnetic plates 25 from its center as opposed to the outer and inner motor armature PCBs 10a & 12 suspending themselves from their corresponding stator rings 9 & 11. The retarder 16 may be optional for some applications where opposing transceivers will be mounted so that their beam splitters will remain oriented orthogonal to each other, e.g., tilted 45° from vertical.

Figure 11:
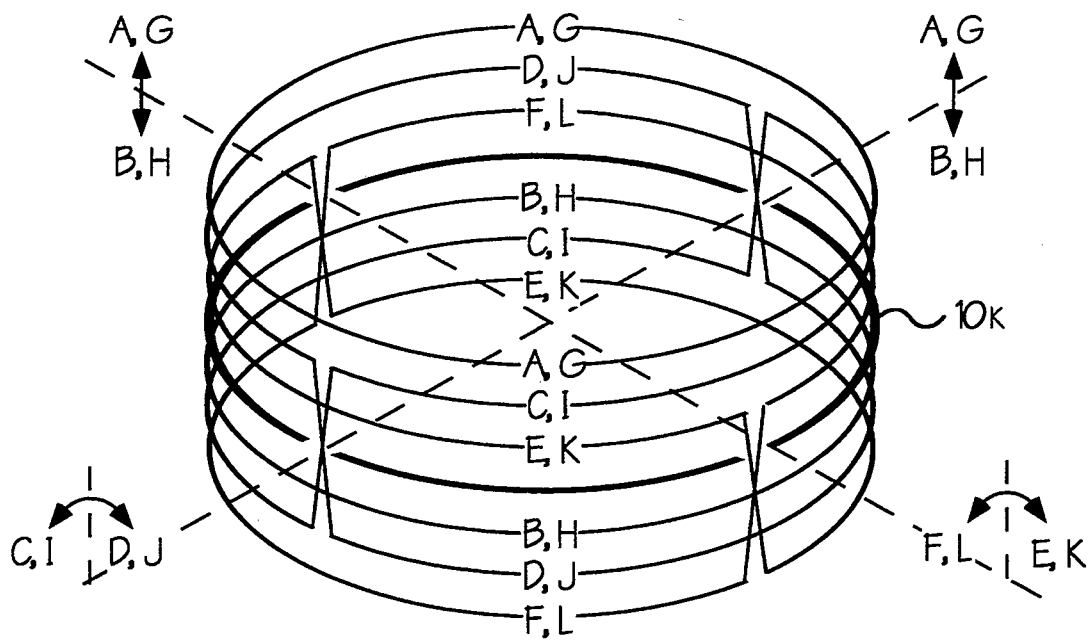
FIG. 11 shows a schematic of six pancake motor armature phases.

FIG. 11 illustrates some aspects of the pancake motor phase windings. This figure is used to support the description of the motor operation in the following section on Operation of the Preferred Embodiment.

Figure 12:
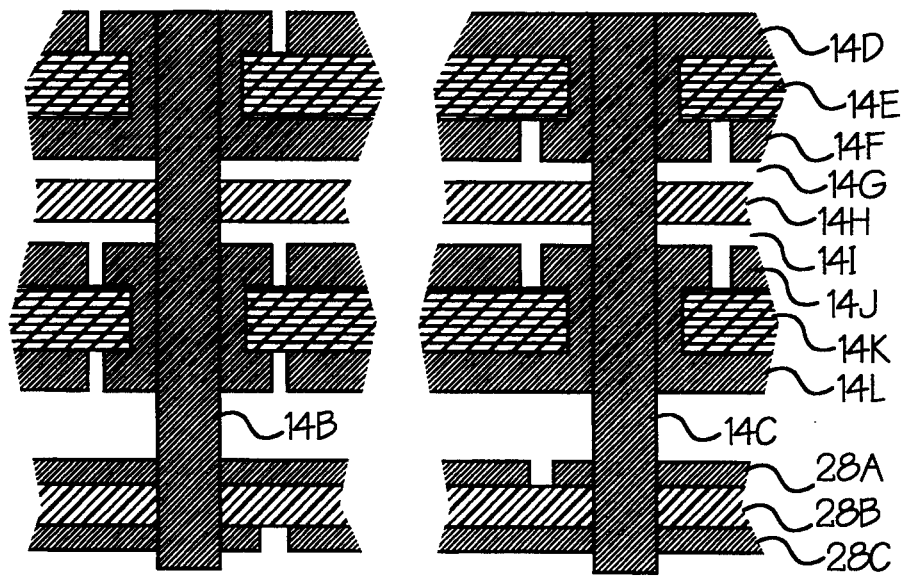
FIG. 12 is a magnified cross sectional view of two sections of the piezo-ceramic mutable mirror which illustrate the lamination and interconnection of the silver electroplated layers by copper pins.

FIG. 12 illustrates a cross section of a possible lamination for a piezo-ceramic bimorphic mutable object mirror 14 and of a laminated flexible PCB 28 which electrically connects the mirror to the optical platform 10c through a connector 28d. The flexible PCB 28 is illustrated with two etched copper foil layers 28a & 28c clad to flexible dielectric layer 28b.

The mirror 14 is constructed of two thin plates 14e & k of piezo-ceramic material which are molded into a paraboloidal shape. Notches are cut for mounting clearance and strain relief as shown in FIG. 8, a center hole is drilled for the beam to pass through and holes are drilled for the connector pins. The plates are then silver electroplated on both sides creating layers 14d, f, j & l and chemically etched for segment isolation. The layers are then bonded to both sides of a separating dielectric layer 14h with adhesive layers 14g & i. Finally connector pins 14b & c are inserted.

Pin 14b illustrates an electrical connection to one inner conductive layer 14f of the mirror. Pin 14c illustrates an electrical connection to the two outer conductive layers 14d & l of a mutable segment. Mirror segments, locations for the connector pins and the shape of the flexible PCB are best illustrated by FIG. 8.

Segments of the mutable object mirror 14 will be independently bendable via high voltage electro-static fields for the following purposes:

The mirror may be mutated to a more concave shape to shorten the focus of the telescope for tracking a light source, e.g., a LED, at close range. A reasonable design goal is ~10 feet. Focusing will also allow two transceivers to establish an efficient link with the beams reflected from a convex mirror.

The mirror may be mutated to a less concave shape to disperse the beam for quicker link acquisition, i.e., focusing beyond infinity.

The mirror may be mutated more in one radial dimension than another to correct for astigmatic aberration caused by atmospheric interference or a protective canopy.

Figure 13:
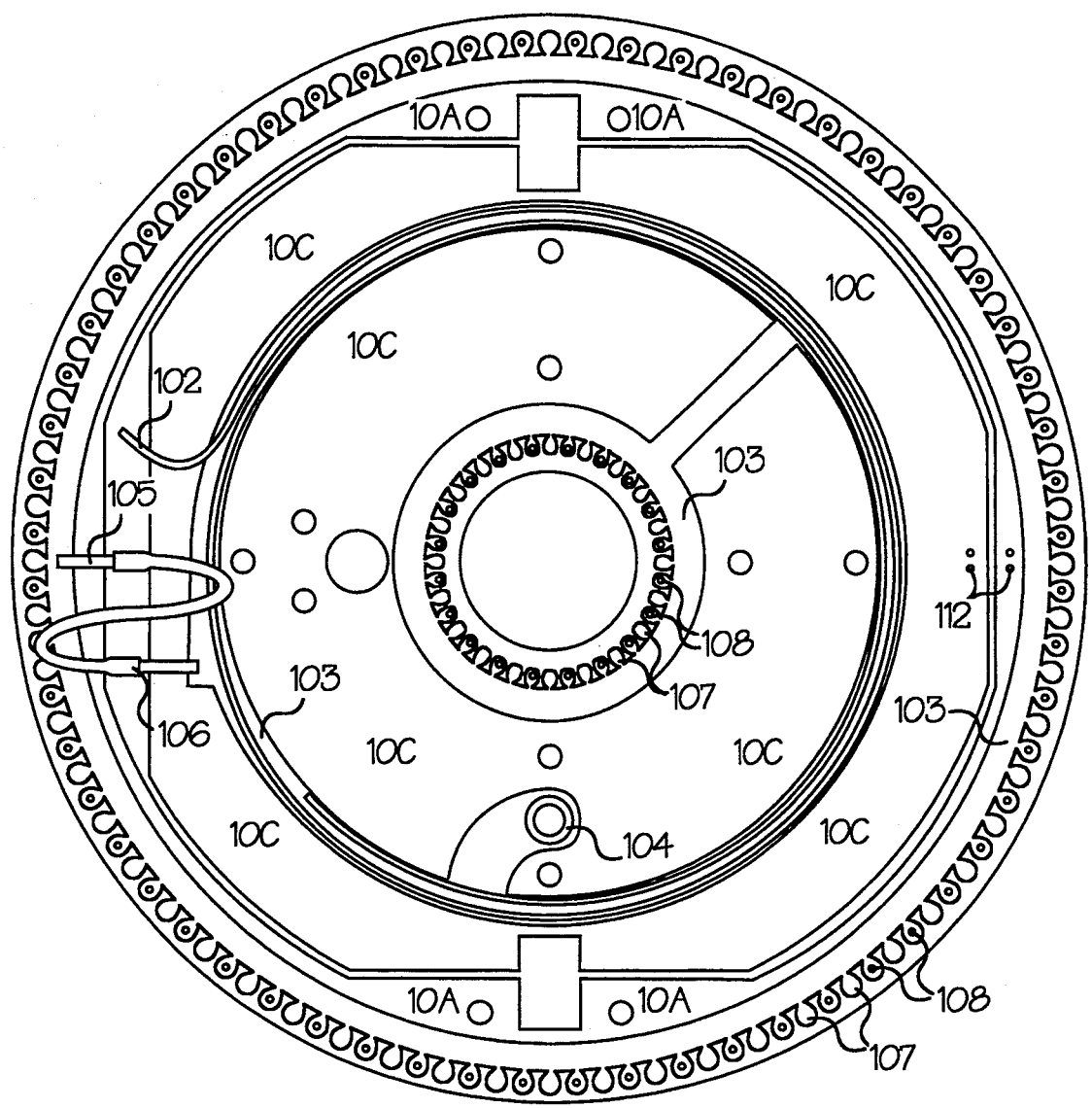
FIG. 13 is a top view of a half section of an alternative embodiment outer pancake motor armature PCB and it's corresponding optical platform PCB designed for pneumatic suspension.

FIG. 13 shows a half section of an alternative outer pancake motor armature PCB 10a and an alternative optical platform PCB 10c designed to be both cooled and pneumatically suspended between the two stator plates. This motor design is expected to be very efficient since no current is required to build the stator field, each winding has many turns and few pass through connections and the windings are efficiently cooled by the refrigerant flow.

The illustrated half side of this PCB is sweat soldered together with the corresponding mirror image half side of a similar PCB to form one solid PCB. Both PCBs have a thick copper clad cover layer which are etched or engraved with an evaporation channel 103 and exhaust ports 107 sealed within.

The outer motor armature ring 10a is connected to the optical platform 10c both electrically through holes 112 and pneumatically by copper tubes 105 and flexible tubing 106. Note that the interconnecting flexible cable 10b has been omitted for this design since fewer phase windings are required for proper motor operation. The evaporation channel 103 is also provided within the inner motor armature (not shown) through "O" ring seal 104.

Liquid refrigerant (R-11) enters capillary tube 102 from a flexible tube (not shown) at a typical operating pressure of 15–20 psia which is the same as the output pressure of the compressor. This high pressure will vary with the temperature of the condenser coil. The capillary tube 102 inner diameter is chosen such that the pressure in the evaporation channel 103 is approximately midway (10–12 psia) between the high pressure and the pressure of 2–5 psia at the exhaust holes 108. The pressure within the shell 7 is only slightly higher than the low pressure at the input to the compressor which is determined relative to the high pressure by the compression ratio of the compressor.

The refrigerant begins to evaporate (10–20%) within the capillary tube 102 and continues to evaporate in the evaporation channel 103. The evaporation channel 103 is laid out such that the evaporation is nearly complete as the vapor refrigerant enters the exhaust ports 107. Half of the exhaust ports 107 exit through exhaust holes 108 on one side of the armature PCB (as illustrated) while the alternate half of the exhaust ports 107 exit through exhaust holes 108 on the near side of the armature PCB (not shown).

Each exhaust port 107 has a restriction at its entrance such that any blockage in flow from its corresponding exhaust hole 108, as would be caused by an off-center condition of the armature, will cause the pressure in the exhaust port 107 to quickly rise from the low pressure of 2–5 psia to the evaporation channel 103 pressure of 10–12 psia. Given 60 exhaust holes 108 on one side of the PCB (as illustrated), and 60 exhaust holes 108 on the other side of the PCB (not shown) each having a size of ⅛ inch diameter, the centering force generated from the pressure differential of 10 psi is 7.36 pounds.

The size of the restriction for each exhaust port 107 is chosen such that the refrigerant flow will have just enough vaporization heat capacity (R-11 has a vaporization heat capacity of 84 BTU/lb.) to cool the PCB to the desired temperature of 20°–50° F. The capacity of the compressor is not critical but must exceed the total flow through the exhaust port 107 restrictions. At the normal operating pressures of 18.6 psia @ 86° F. high side and 24 in. vacuum @ 5° F. low side, the vapor volume will be approximately 1000 times the volume of the liquid refrigerant.

Figure 14:
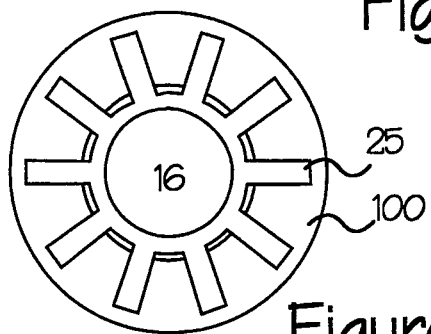
FIG. 14 is a plan view of a permanent magnet retarder motor armature corresponding to the optical platform PCB shown in FIG. 13.
Figure 15:
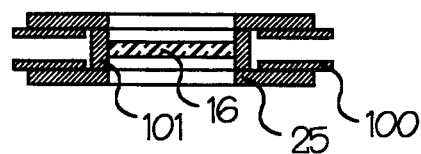
FIG. 15 is a cross-sectional view of the permanent magnet retarder motor armature shown plan view in FIG. 14.

FIG. 14 shows a plan view of a permanent magnet retarder motor armature for the alternative pneumatic suspension shown at the center in FIG. 13. FIG. 15 shows a cross section view of the same armature. The retarder plate 16 is supported directly by a cylindrical permanent magnet 101. Thin aluminum pressure plates 100 are bonded to radially magnetized permanent magnet pole pieces 25. These armature pieces 100 & 25 are bonded to both sides of the cylindrical permanent magnet 101 while straddling the center of the optical platform PCB 10c.

The two armature pressure plate rings 100 act against the pressure of the exhaust ports 107 to provide a frictionless suspension for the armature. Pole pieces 25 have arms at intervals which are radially magnetized to create an uneven magnetic field which permeates the optical platform PCB 10c such that currents in PCB phase windings (see FIG. 16) will create both a torque about the motor's axis and a centering force within the plane of the armature.

Figure 16:
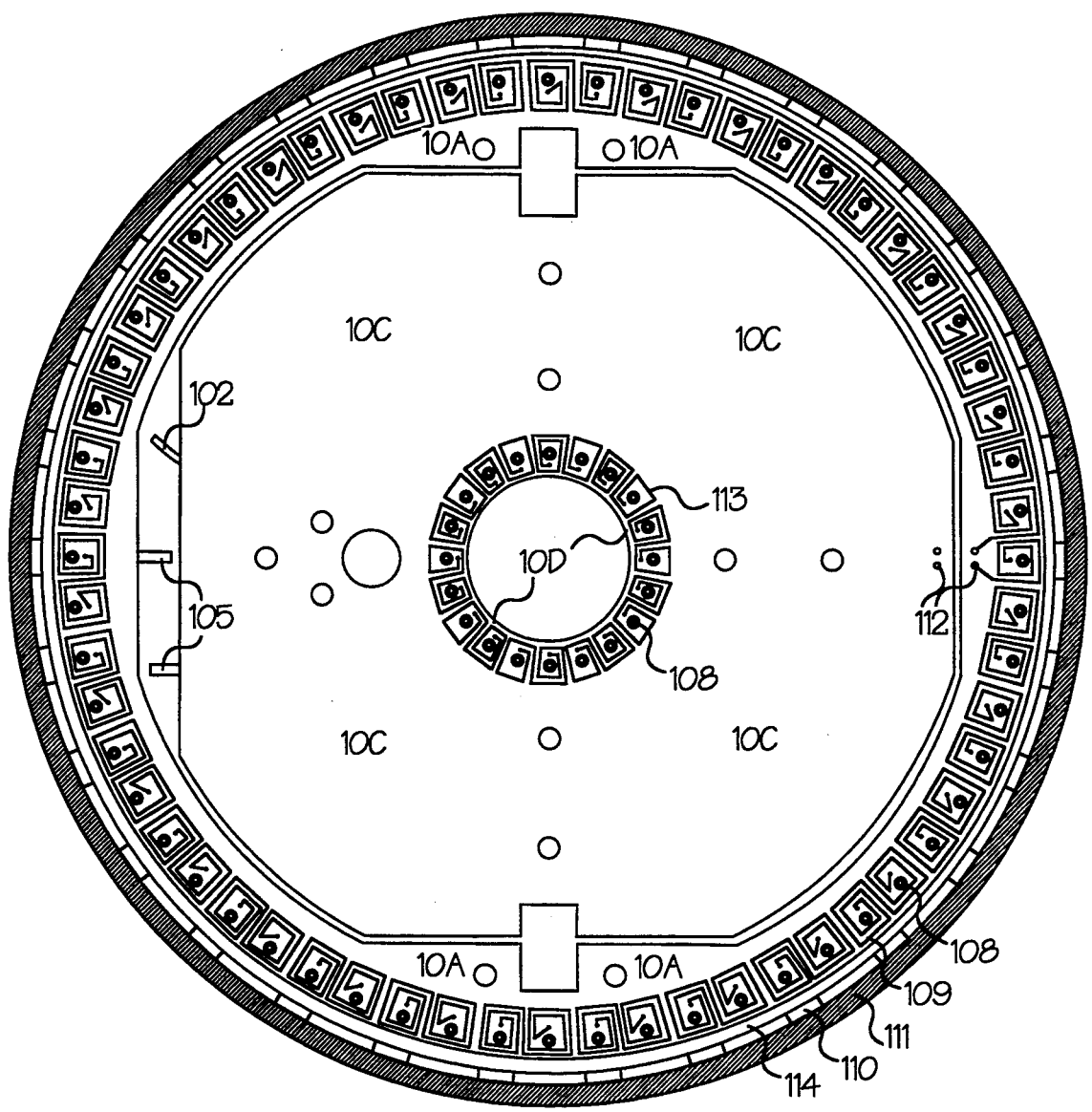
FIG. 16 is a plan view of the outer pancake motor armature PCB and optical platform PCB corresponding to the half section view of FIG. 13.

FIG. 16 is a plan view of the alternative pneumatically suspended outer pancake motor armature PCB 10a, the pneumatic optical platform PCB 10c, and a corresponding permanent magnet stator 110 & 111 for the outer motor. A single winding layer is illustrated for the outer motor armature 10a and another single winding layer is illustrated for the retarder motor stator 10d.

Each phase winding requires two etched layers to complete the loop around the armature edge. The windings alternate from one layer to the other passing through the plated through exhaust holes 108 and continue with the same phasing on the other layer. As illustrated, the direction of the outer motor windings 109 reverse every 6° and thus repeat every 12°. The direction of the retarder motor stator windings 113 reverse every 18° and thus repeat every 36°.

The windings pass through the plated through exhaust port holes 108 and continue with the same phasing on another layer to make the winding a continuous loop. Each motor requires two phase windings (four layers) offset from each other in order to generate proportional torque from four phase motor control logic. The winding offset aligns with the offset created by alternating the PCB side for each exhaust hole 108. Thus, the two phase windings for each motor are each on opposite sides of the center layer illustrated in FIG. 13. As illustrated, the outer motor winding phases and exhaust holes 108 would be offset 3° from each other and the inner motor winding phases and exhaust holes 108 would be offset 9° from each other.

The outer motor stator is similar to the retarder motor armature shown in FIGS. 14 and 15 and are formed by two radially magnetized permanent magnets 110, a cylindrical permanent magnet 111 and two thin aluminum pressure plates 114. The stator creates and uneven static magnetic field which permeates the outer motor armature ring 10a.

Classification

The classification of the transceiver would be a function of the power of the laser diode 19, size of the object mirror 14 and the intended use of the transceiver. Some transceivers may be safe only with logic to protect users from viewing the beam directly and would be classified by the American National Standards Institute as a Class 3B laser device (referring to ANSI Z136.1—1986). A Class 3B laser device is defined by the standard as "Infrared (1.4 μm to 1 mm) and ultraviolet (0.2 to 0.4 μm) lasers and laser systems which can emit accessible radiant power in excess of the Class I accessible emission limits for the maximum possible duration inherent in the design of the laser or laser system, but which cannot produce a radiant exposure of $10^{joules}/cm2$ within an exposure time <0.25 seconds. Note: the interval of 0.25 seconds is an approximate blink response time for intrabeam viewing of non-visible laser emissions.

OPERATION OF THE PREFERRED EMBODIMENT

Pancake Motor Operation

FIG. 11 shows a schematic of six pancake motor winding phases to illustrate how the inner and outer pancake motor armature windings 10a & 12 are actively centered electromagnetically between their corresponding two magnetic stator rings 9 & 11 by balancing the current in each of three complementary phase windings. Similar motor winding phases are used for the retarder motor stator windings 10d in order to suspend and rotate the retarder armature rings 25. Several other combinations of phase windings are possible which would achieve the same results. As this is for illustration only, the invention is not to be limited to these windings. Further, this illustration may not apply if the motor's suspension is assisted pneumatically.

An off-center condition is detected from the variable capacitors described in FIG. 9 and used to control the current balancing. This current balancing also provides controlling logic with accurate force and acceleration information for three degrees of freedom of the suspended mass. Because the pancake motors are all oriented approximately orthogonal to each other, torque information obtained from one motor suspension may be used by controlling logic (not shown) to help determine the correct phasing for another motor about its primary axis.

A current in any phase winding will form an electromagnet between the armature center layer and one or both stator plates. Two complementary phase windings (C, I & D, J) will provide torque about an axis in the motor plane while another two complementary phase windings (F, C & E, K) will provide torque about the orthogonal axis in the motor plane as indicated by the circular arrows. These phase windings have points, 12a in FIG. 6, where the phases cross over to the other side of the center magnetic layer. Another two complementary phase windings (A, G & B, H) will provide a translational force towards one of the two stator plates as indicated by the vertical arrows.

Referring again to FIG. 9, for each motor a high frequency, high impedance signal is transmitted to the plate rings on both sides of the PCB through opposing cover layer lands T. The signal amplitude received by the two common lands BH is compared to the signal amplitude received from the opposing two common lands AG to determine which translational phase windings to drive A, G or B, H. Similarly, the signal amplitude received by the land FC is compared to the signal amplitude received from the opposing land EK to determine which torque phase windings to drive F, C or E, K and the signal amplitude received by the land DJ is compared to the signal amplitude received from the opposing land CI to determine which torque phase windings to drive C, I or D, J.

Independent Mode Operation

Non communication related applications of the transceiver may depend upon the ability of the pancake motors to both precisely encode the angular displacement of the optical axis relative to the carrier and to measure the angular acceleration and rotation of the optical axis.

For application as a laser projector, corners of the projection screen may be marked by infrared LEDs allowing a transceiver to align with the screen area. Two transceivers with visible lasers may transmit with orthogonal polarization to project a three dimensional image to viewers wearing polarizing filter lenses. The two transceivers may accurately track each other as each could detect the reflection of the other.

As with more conventional laser display devices, the transmission beam may be indirectly reflected from the surfaces of a rotating prismatic mirror in order to provide a fast raster scan retrace. However, the transceivers may also have application in augmenting laser display systems to draw moving characters and only periodically aligning with one or more other transceivers. Depending upon the speed of displacement required, these applications may require an additional motor to translate the position of the laser diode relative to the object mirror axis.

The transceiver may also find application as an imaging device to construct a three dimensional image of its surroundings. For this application, the transceiver would use a quarter wave retarder to produce a circularly polarized beam. Reflection of the beam from a diffuse reflecting object will be received by the transceiver with opposite or orthogonal polarization and thus easily separated from the transmission beam.

Techniques to determine distance from timing the transmission delay are well known in the art. Timing information would be encoded onto the modulation of the laser source and correspondingly decoded upon receipt of the reflected beam. Measurement of the transmission delay will thus indicate the distance to the reflecting object.

Dependent Link Acquisition

A transceiver is required to operate independently until it has acquired a dependent link and may require some of the functionality described above for independent mode application. For acquiring a link, a transceiver will first scan for the beacon signal (a wide angle modulated light source) of another device. Once a beacon is detected, the transceiver may align with and track the received beam while continually adjusting its active optic components to obtain maximum transmission efficiency.

The beacon signal may be provided by one or more beacon intensity modulated Light Emitting Diodes (LEDs) 27. A transceiver seeking to establish a dependent link will enable and continually scan for the beacon of another transceiver also in acquisition mode. A beacon LED 27 is mounted to the inner motor armature PCB as illustrated in FIGS. 7 and 8.

The scan pattern would probably be a spiral due to the angular inertia of the internal structure. The acquisition may be hastened if vector and range information for another transceiver in acquisition mode is available through a network or by radio beacon. The controlling logic would point the transceiver in the direction of the other transceiver before beginning the scan.

The beacon LED 27 will radiate randomly polarized light at a wide dispersion angle so that two transceivers would not require simultaneous alignment in order to detect each others beam. The modulated carrier would immediately indicate to a receiving transceiver that a remote transceiver in acquisition mode is within the telescope 14 & 15 field of view (FoV). The wide dispersion of the beacon will cause a rapid attenuation of the light energy with distance, however, the signal strength required for detection may be several orders of magnitude less than that required for reliable tracking and information transfer.

FIG. 4 illustrates a photodiode translation motor 23 as one mechanism to detect and track a received beam. The motor would have a different low audio resonate frequency for each direction of movement. Analog circuitry (not shown) would vibrate the photo-diode until an acquisition signal is detected. Unless controlling network logic chooses to ignore the signal, the transceiver would seek the direction in which the beam was detected and then switch to tracking mode. This direction could be determined by comparing the amplitude phase of the received signal with the phase of the translation motor.

Once the motors have approximately aligned the telescope with the received beam, the analog circuitry (not shown) would center the vibration of the photo-diode's active area about the focal point of the received beam while reducing the amplitude of the vibration until the second order harmonics are just detectable. Since the active area of the photo-diode 21 may be only slightly larger than the waist of the received beam in the focal plane, the photo-diode will require very slight movement while tracking (<1 mm) to keep the diode centered.

Motor control logic (not shown) will determine the relative off-center displacement of the photo-diode 21 and correspondingly adjust the pointing of the telescope so that the transmit beam would align or nearly align with the received beam. The logic will then enable the laser diode and await alignment from the remote transceiver.

The cross-link is established and transmission of information enabled once both transceivers receive the other's laser beam. The beacon LEDs are then disabled as they would contribute little to the overall transmission efficiency and would continue to attract other transceivers in acquisition mode.

Dependent links may be established either directly between a pair of transceivers or indirectly between multiple transceivers when all align with a diffuse reflecting object. A convex mirror may act as a concentrator for transceivers enabling them to link where a direct line-of-sight path does not exist between the transceivers, or to more quickly switch the link between multiple transceivers.

Once the optical cross-link is established, the light source will be modulated using one of the many techniques available in the art to convey information. Many encoding/decoding techniques are available in the art to provide a reliable full duplex data link even if the received signal is weak using forward error correction. Very long range communications may be possible under favorable environmental conditions and very high bandwidth (>1 Gigabit per second) would be possible at shorter range. It is anticipated that different tradeoffs of range, bandwidth and cost would be made for different applications. These techniques and their tradeoffs are outside the scope of this description.

Dependent Link Tracking

While tracking the received beam, the motors are controlled so as to keep the transmission beam aligned with the received beam. This occurs when the photo-diode 21 is at some fixed displacement relative to the optical housing 20. Logic will continually vacillate this displacement slightly while monitoring the transmission efficiency in order to optimize this relative displacement. For most applications this will result in a precise alignment of the transmit beam with the received beam, however, the transceiver may also link with devices requiring slightly unaligned beams such as a simple LED and adjacent photodiode.

The controlling logic will also continuously dither the active optical components, e.g., the mirror segments if mutable and the beam polarization angle to maximize the efficiency of the transmission. Indication of whether the transmission efficiency is increasing or decreasing will be returned from the opposing transceiver by either a digital encoded bit or by a change in the carrier modulation.

The logic may save parameters for the optimal relative positions of the active optical components while tracking, in order to acquire and optimize new links more readily. If the environment introduces variable aberrations due to pointing in different directions relative to the carrier, then the logic may store parameters for several directions.

A transceiver's link is broken when the remote transceiver is out of range, or its optical path is interrupted, or the controlling logic is instructed by a network process to interrupt the link and scan for another transceiver. When the link is broken, the transceiver will immediately revert to acquisition mode.

In conclusion, the transceiver is unique in utilizing the pancake motors which are in themselves novel. While the present invention has been described with reference to the specific embodiment illustrated in the drawings and described in the specification, this embodiment is illustrative only and is not to be construed as limiting the invention. Many devices and techniques are available in the art for several functions of the described apparatus. Although the description of the specific embodiment makes reference to some possible variations, no attempt is made to cite all variations considered reasonable by the inventor. Various modifications will be apparent to those skilled in the art without departing from the scope and spirit of the invention as defined by the appended claims.

I claim:

1. A compact transceiver adapted for carrier mounting to optically span free space, atmosphere or underwater for laser image projection comprising:

a spherical radiation permeable shell having a supporting base for hermetically housing components thereof;

(a) a system of motors including two nested pancake motors: an outer motor having its stator supported by the shell and an inner motor having its stator supported within and orthogonal to an outer motor armature, outer and inner armatures of said pancake motors being suspended in a frictionless manner from their respective stators and having some lateral and rotational freedom of movement so as to isolate the armatures from the stator movement;

(b) said armatures having a common center clearance for a telescope to expand and collimate transmission radiation, focus received radiation and to reflect and absorb off-axis radiation; said telescope being coaxially mounted on a platform which is transversely supported by the inner motor armature within said clearance;

(c) means, responsive to modulated transmission radiation containing information from the carrier for generating an intense coherent radiation to be expanded and collimated by said telescope; and phase proportional logic means selected from the group consisting of internal and external to the shell for effecting said system of motors to direct said telescope to a pre-determined direction relative to the carrier mounting whereby said transmission radiation is maintained in the desired direction and isolated from carrier movement.

2. A compact transceiver adapted for carrier mounting to electromagnetically span free space, atmosphere or underwater for surveillance of surrounding objects comprising:

a spherical radiation permeable shell having a supporting base for hermetically housing components thereof;

(a) a system of motors including two nested pancake motors; an outer motor having its stator supported by the shell and an inner motor having its stator supported within and orthogonal to an outer motor armature, outer and inner armatures of said pancake motors being suspended in a frictionless manner from their respective stators and having some lateral and rotational freedom of movement so as to isolate the armatures from stator movement;

(b) said armatures having a center clearance for a telescope to expand and collimate transmission radiation, focus received radiation and to reflect and absorb off-axis radiation; said telescope being coaxially mounted on a platform which in turn is transversely supported by the inner motor armature;

(c) means, responsive to modulated transmission radiation containing information from the carrier for generating an intense coherent radiation to be expanded and collimated by said telescope;

(d) means mounted on said platform for separating a received radiation from the transmission radiation, said received radiation being a portion of the transmission radiation reflected back from the surrounding objects;

(e) means for determining the distance to the surrounding reflecting objects including means for measurement of time delay between transmission and receipt of reflected radiation; and phase proportional logic means selected from the group consisting of internal and external to the shell for effecting said system of motors to direct said telescope to a pre-determined direction relative to the carrier mounting whereby said transmission radiation is maintained in the desired direction and isolated from carrier movement.

3. A compact transceiver adapted for carrier mounting to electromagnetically span free space, atmosphere or underwater for telecommunication of information with a cooperating device comprising:

a spherical radiation permeable shell having a supporting base for hermetically housing components thereof:

(a) a system of motors including two nested pancake motors; an outer motor having its stator supported by the shell and an inner motors having its stator supported within and orthogonal to an outer motor armature, outer and inner armatures of said pancake motors being suspended in a frictionless manner from their respective stators and having some lateral and rotational freedom of movement so as to isolate the armature from the stator movement;

(b) said armature having a center clearance for a telescope to expand and collimate transmission radiation, focus received radiation and to reflect and absorb off-axis radiation; said telescope being supported by a platform which in turn is transversely supported by the inner motor armature;

(c) means, responsive to modulated transmission radiation containing information from the carrier for generating an intense coherent radiation to be expanded and collimated by said telescope;

(d) means mounted on said platform for separating a received radiation from the transmission radiation, and focusing said received radiation to a detecting device, said received radiation being transmitted from a cooperating device;

(e) means for determing the direction of said received radiation relative to said transmission radiation so as to track said cooperating device;

(f) means for encoding and decoding information for modulated transmission radiation and for modulated received radiation respectively; and phase proportional logic means selected from the group consisting of internal and external to the shell for effecting said system of motors to direct said telescope to a pre-determined direction relative to the carrier mounting whereby said transmission radiation is maintained in the desired direction and isolated from carrier movement.

4. The transceiver in accordance with claims 1, 2 and 3 wherein means for generating coherent radiation is a laser diode.

5. A transceiver according to claim 4 wherein the telescope comprising an off-axis paraboloidal mirror in optical communication with the laser diode for collimating the transmission radiation; a concave paraboloidal object mirror having a center opening, co-axially mounted on the platform for expanding and compressing radiation; and a convex paraboloidal mirror disposed above said object mirror for reflecting radiation.

6. The transceiver in accordance with claim 5 wherein said concave object mirror is made of laminated piezo-ceramic material with silver electroplated segments to enable mutating the shape of the mirror to compensate for environmental aberrations.

7. The transceiver in accordance with claims 1, 2 or 3 further comprising means for cooling said housed components, said means including a closed mechanical refrigeration system having refrigerant in fluid communication with the interior of said shell, said system including a compressor, motor, evaporator and condenser.

8. The transceiver in accordance with claim 7 wherein said condenser is partially embedded in said shell-thus providing heat to the shell.

9. The transceiver in accordance with claim 7 wherein said compressor is contained within said supporting base and wherein said system of motors includes a mechanical transmission driven by the compressor motor for rotating said outer pancake motor stator within said shell.

10. The transceiver in accordance with claims 2 or 3 wherein said means for focusing the separated received radiation to the photo-detecting device is an off-axis paraboloidal converging mirror in optical communication with said separated received radiation.

11. The transceiver in accordance with claims 2 or 3 further comprising means for rejecting extraneous radiation said means being a molded plastic housing.

12. The transceiver in accordance with claim 3, further comprising at least one intensity-modulated radiation emitting diode for signaling the cooperating device.

13. The transceiver in accordance with claims 2 or 3 wherein said means for separating the received radiation from the transmission radiation is a polarizing beam splitter in optical communication with said radiations.

14. The transceiver of claim 13 further comprising a retardation plate, in optical communication with said beam splitter and interposed within said telescope for rotating the polarization of the transmission and received radiation relative to the beam splitter and said retardation plate being selected from the group consisting of a half and a quarter wave retarder.

15. The transceiver in accordance with claim 14 further comprising means to rotate said retardation plate for effectively varying the degree of rotation of said radiation polarization.

16. The transceiver in accordance with claim 15 wherein means to rotate said retardation plate is a third pancake motor coaxial to the telescope and said motor supports the retardation plate.

17. The transceiver of claims 1, 2 or 3 wherein said system of motors further comprising a base motor for rotating the shell, thereby rotating the outer pancake motor stator;
each motor of said system having means for generating torque between its stator and armature;
each pancake motor having a circular, flat armature fabricated of Printed Circuit Board (PCB) with an interlace of phase windings near it edge; and
each pancake motor stator consisting of two flat rings, said rings being spaced from and fixed to each other and straddling over its armature edge and at a clearance therefrom; and
each pancake motor having means for frictionlessly suspending the armature from its stator thereby isolating the armature from vibration of its stator transmitted to it from the carrier.

18. The transceiver in accordance with claim 17 wherein said base motor is within the shell and pivots on the outer pancake motor stator.

19. The transceiver in accordance with claim 17 wherein the supporting base provides a flexible shaft in fluid communication with the shell; and the base motor rotates said shaft thereby pivoting the shell wherein the outer motor stator is affixed to the inside of the shell and the axis of the outer motor is orthogonal to the flexible shaft.

20. The transceiver in accordance with claim 17 wherein the inner motor armature moves approximately $-30$ degree from its displacement;
the outer pancake motor armature moves greater than $-90$ degree but less than $-180$ degree from its displacement;
the base motor armature moves approximately 360 degree; and
the motors having means for encoding angular displacements of their armatures relative to their stators.

21. The transceiver in accordance with claim 17 wherein said means for generating torque comprises offset multiple phase windings over the armature and said stator flat rings are zig-zag shaped and having inner and outer diameters generally conforming to the shape of the armature phase windings with some windings partially covered.

22. The transceiver in accordance with claim 17 wherein means for generating torque further comprises:
permanent magnets within the stators for generating static magnetic fields permeating the edges of the armatures at intervals and
the phase windings of the armatures being in spiral patterns for generating torque.

23. The transceiver in accordance with claim 17 wherein said frictionless suspension means for each pancake motor armature from its stator is electromagnetic and effected by currents in pancake motor armature phase windings and wherein
said armature has a magnetic center layer magnetically isolates said phase windings on both sides of said center layer thereby actively centering the armature between its stator rings by currents in said phase windings;
said armatures further comprises copper lands etched in a cover layer on both sides of the PCB, each forming a variable capacitor with the stator ring, said variable capacitors collectively detecting an off-center condition; and
said electromagnetic armature suspension further enables measurement of forces acting on the armature.

24. The transceiver in accordance with claim 17 further comprising means for directly cooling said pancake motor armatures, said cooling means being refrigerant evaporation within the PCB and wherein said frictionless suspension for said armatures from said stators is effected by pneumatic pressure from said vaporized refrigerant exhausting from a plurality of ports around both sides of the armature edges.

25. The transceiver in accordance with claim 3 wherein said tracking means is a photo-detecting device having at least three proportional outputs thereby causing the logic means to determine the direction of the received radiation relative to the transmission radiation; withdrawal of rejections and reexamination of the amended claims are requested.

26. The transceiver in accordance with claim 3 wherein said means for tracking the cooperating device is a translation motor responsive to the logic means to move the detecting device in a desired direction relative to said focusing means thereby enabling the logic means to determine the direction of the received radiation relative to the transmission radiation and further enabling the logic means to protect the detecting device from intense radiation by moving the device behind a baffle within a plastic housing.

* * * * *